US009588402B2

(12) United States Patent
Baxter et al.

(10) Patent No.: US 9,588,402 B2
(45) Date of Patent: Mar. 7, 2017

(54) ON-CAMERA LED FRESNEL LIGHTING SYSTEM INCLUDING ACTIVE COOLING

(71) Applicant: Litepanels, LTD, Bury St Edmonds, Suffolk (GB)

(72) Inventors: Kevin C. Baxter, Glendale, CA (US); Fred H. Holmes, Cleveland, OK (US); Ken Fisher, North Hollywood, CA (US)

(73) Assignee: LITEPANELS, LTD (GB)

( * ) Notice: Subject to any disclaimer, the term of this patent is extended or adjusted under 35 U.S.C. 154(b) by 0 days.

(21) Appl. No.: 14/534,375

(22) Filed: Nov. 6, 2014

(65) Prior Publication Data
US 2015/0062862 A1 Mar. 5, 2015

Related U.S. Application Data

(63) Continuation of application No. 13/048,847, filed on Mar. 15, 2011, now Pat. No. 8,882,283.

(51) Int. Cl.
*G03B 15/02* (2006.01)
*G03B 15/05* (2006.01)
(Continued)

(52) U.S. Cl.
CPC .............. *G03B 15/05* (2013.01); *F21V 5/045* (2013.01); *F21V 29/02* (2013.01); *F21V 29/025* (2013.01);
(Continued)

(58) Field of Classification Search
CPC ......... G03B 15/05; G03B 21/16; F21V 29/51; F21V 5/045; F21V 14/06; F21V 29/02;
(Continued)

(56) References Cited

U.S. PATENT DOCUMENTS 5,023,709 A 6/1991 Kita et al.
8,702,255 B2 4/2014 Baxter et al.
(Continued)

FOREIGN PATENT DOCUMENTS

DE 202007008430 10/2008
EP 1998108 A1 12/2008
(Continued)

OTHER PUBLICATIONS

European Patent Office PCT International Search Report, International Application No. PCT/US2011/028573, mailed Sep. 2, 2011.
(Continued)

*Primary Examiner* — Anh Mai
*Assistant Examiner* — Hana Featherly
(74) *Attorney, Agent, or Firm* — Fellers, Snider, Blankenship, Bailey & Tippens, P.C.

(57) ABSTRACT

A lighting apparatus for film, television, video capture, motion picture and photography which includes a Fresnel lens fixed in a housing which contains a tight array of high power LEDs. The LED panel or board is mated to a heat dissipating apparatus to provide active cooling and together forming an LED engine. The LED engine is mounted to a slider allowing the LED engine to be adjusted within the housing with respect to the lens. Light shaping diffusion may be included on the housing. A power supply unit may also be included in the housing. When in electrical communication, the LED engine and power supply unit function as an integrated self-contained lighting apparatus. Optionally, the power supply may have an integrated dimmer switch, and may be capable of receiving PFC power or have an integrated battery unit.

24 Claims, 13 Drawing Sheets

(51) Int. Cl.

| | | |
|---|---|---|
| *F21V 5/04* | (2006.01) | |
| *F21V 29/02* | (2006.01) | |
| *G03B 21/16* | (2006.01) | |
| *H05B 33/08* | (2006.01) | |
| *F21V 29/67* | (2015.01) | |
| *F21V 29/70* | (2015.01) | |
| *F21V 29/71* | (2015.01) | |
| *F21V 29/74* | (2015.01) | |
| *F21V 29/76* | (2015.01) | |
| *F21V 29/51* | (2015.01) | |
| *F21V 14/06* | (2006.01) | |
| *F21W 131/406* | (2006.01) | |
| *F21V 29/00* | (2015.01) | |
| *F21Y 101/00* | (2016.01) | |

(52) U.S. Cl.
CPC ............ *F21V 29/30* (2013.01); *F21V 29/407* (2013.01); *F21V 29/677* (2015.01); *F21V 29/70* (2015.01); *F21V 29/71* (2015.01); *F21V 29/74* (2015.01); *F21V 29/76* (2015.01); *G03B 21/16* (2013.01); *H05B 33/0803* (2013.01); *F21V 14/06* (2013.01); *F21V 29/006* (2013.01); *F21V 29/51* (2015.01); *F21W 2131/406* (2013.01); *F21Y 2101/00* (2013.01); *F21Y 2105/10* (2016.08); *F21Y 2115/10* (2016.08)

(58) Field of Classification Search
CPC ...... F21V 29/006; F21V 29/677; F21V 29/70; F21V 29/71; F21V 29/74; F21V 29/76; F21V 29/025; F21V 29/30; F21V 29/407; F21W 2131/406; H05B 33/0803; F21Y 2101/00; F21Y 2105/10; F21Y 2115/10

USPC .......................................................... 362/6
See application file for complete search history.

(56) References Cited

U.S. PATENT DOCUMENTS

| | | |
|---|---|---|
| 2003/0174209 A1 | 9/2003 | Piazzi et al. |
| 2004/0120156 A1 | 6/2004 | Ryan |
| 2005/0094236 A1* | 5/2005 | Chaleff ............. G06K 7/10722 359/205.1 |
| 2005/0168995 A1 | 8/2005 | Kittelmann et al. |
| 2007/0019415 A1 | 1/2007 | Leblanc et al. |
| 2007/0159817 A1 | 7/2007 | Evans et al. |
| 2007/0189013 A1 | 8/2007 | Ford |
| 2007/0228835 A1 | 10/2007 | Varzhabedian |
| 2007/0236344 A1 | 10/2007 | Desrosiers et al. |
| 2008/0062694 A1 | 3/2008 | Lai et al. |
| 2009/0027570 A1* | 1/2009 | Fujinawa ............... G03B 21/16 348/744 |
| 2009/0084531 A1 | 4/2009 | Scordino et al. |
| 2009/0129092 A1 | 5/2009 | Chen |
| 2009/0296386 A1 | 12/2009 | Wang et al. |
| 2010/0204841 A1 | 8/2010 | Chemel et al. |

FOREIGN PATENT DOCUMENTS

| | | |
|---|---|---|
| WO | 2006113745 A2 | 10/2006 |
| WO | 2009033051 A1 | 3/2009 |
| WO | 2011127481 A2 | 10/2011 |
| WO | 2011127481 A3 | 3/2012 |

OTHER PUBLICATIONS

European Patent Office PCT Written Opinion, International Application No. PCT/US2011/028573, mailed Sep. 2, 2011.

* cited by examiner

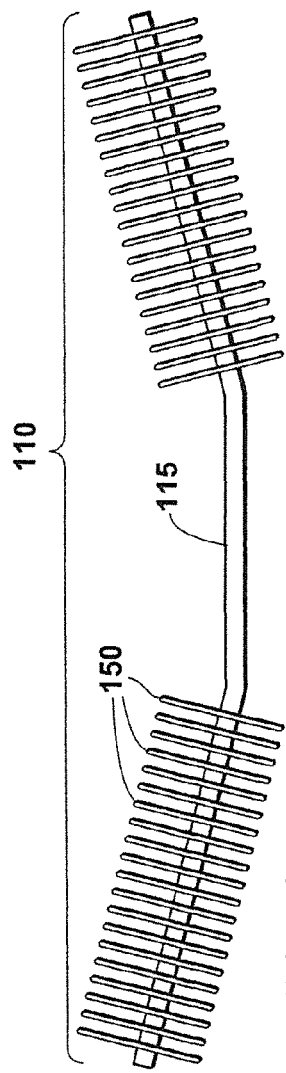
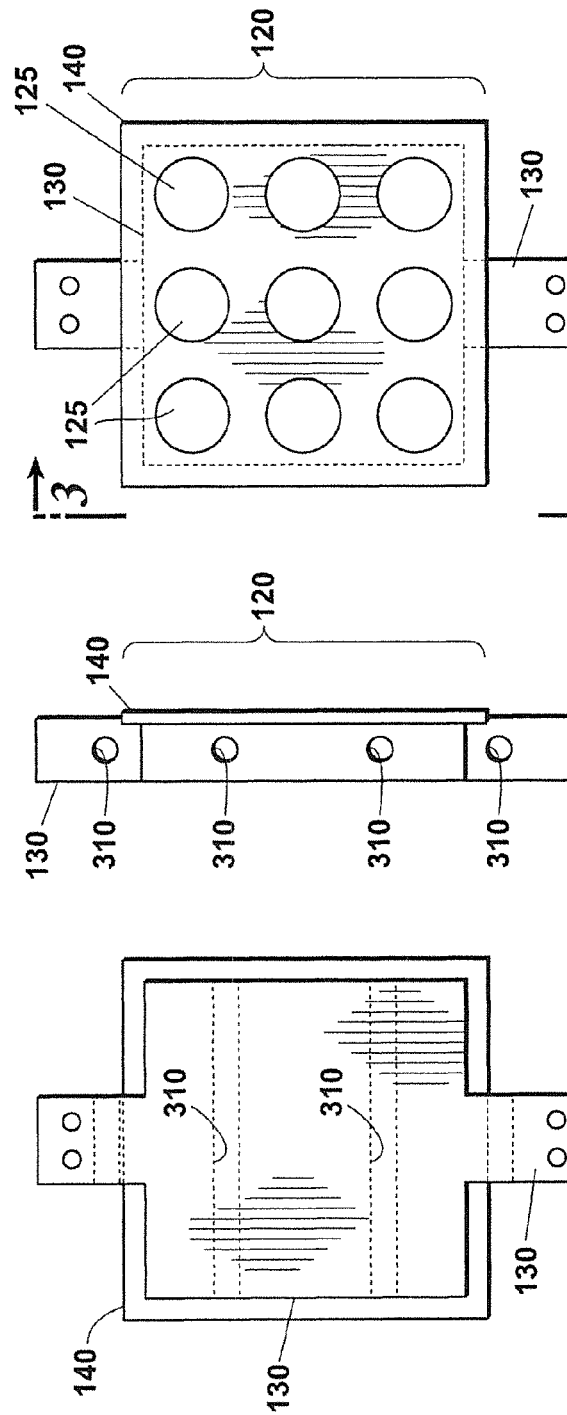

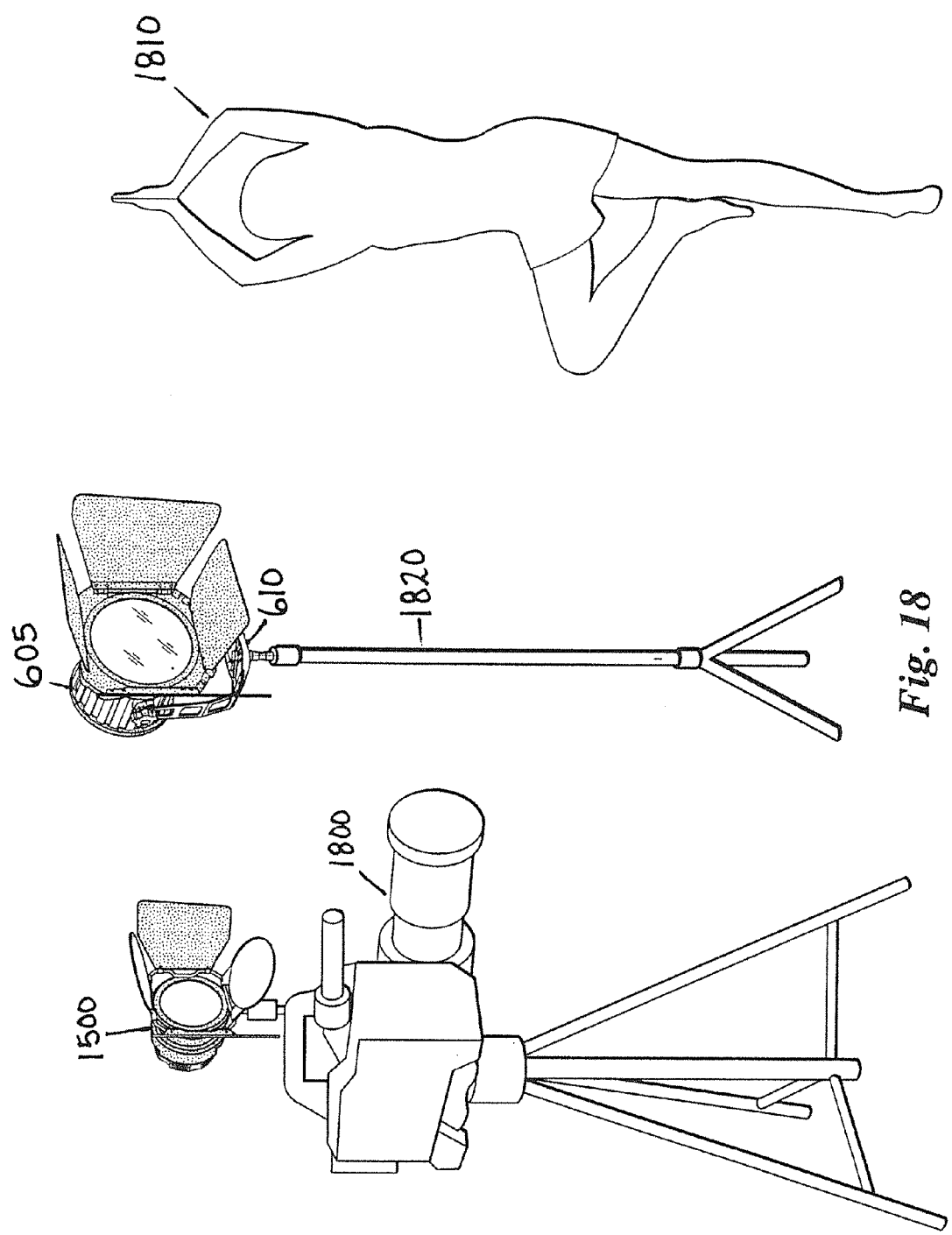

US 9,588,402 B2

ON-CAMERA LED FRESNEL LIGHTING SYSTEM INCLUDING ACTIVE COOLING

RELATED CASES

This application is a continuation of co-pending U.S. patent application Ser. No. 13/048,847 filed on Mar. 15, 2011 and incorporates said application by reference into this disclosure as if fully set out at this point.

BACKGROUND OF THE INVENTION

1) Field of the Invention

The field of the present invention relates to lighting fixtures and systems as may be used in photography, film, television, video, motion picture and other applications.

2) Background

Lighting systems are an integral part of the film, television, video, motion picture, and photography industries. Proper illumination is necessary when filming movies, television shows, or commercials, when shooting video clips, or when taking still photographs, whether such activities are carried out indoors or outdoors. A desired illumination effect may also be ordered for live performances on stage or in any other type of setting.

Various conventional techniques for lighting in the film and television industries, and various illustrations of lighting equipment, are described, for example, in Lighting for Television and Film by Gerald Millerson (3rd ed. 1991), hereby incorporated herein by reference in its entirety, including pages 96-131 and 295-349 thereof, and in Professional Lighting Handbook by Verne Carlson (2nd ed. 1991), also hereby incorporated herein by reference in its entirety, including pages 15-40 thereof.

Fresnel lenses were designed originally to allow for large geometry lensing in lighthouses, well before the advent of the true incandescent light bulb. Fresnel lenses were later used in early theatrical and movie lighting fixtures because they allowed the light to be shaped into beams of smooth light that could project for great distances. Such lighting fixtures are commonly referred to as "Fresnels."

As stated above, Fresnel fixtures including glass lenses were and are used for film, television, motion picture, and live theatre applications. Typical Fresnel fixtures consist of a metal housing, reflector, light bulb assembly, and Fresnel lens. Fresnels fixtures for theatrical applications are commonly available in lens diameters of 3, 6 or 8 inches with lamps ranging in power from 150 W (typically with a 3-inch Fresnel lens) to 2000 W (with an 8-inch Fresnel lens). In film, television, and motion picture lighting, a much greater range of lens and bulb sizes are typical. For these applications, lenses commonly range in size from 2 to 24 inches, and light bulb power ranges between 200 W and 20,000 W.

Known Fresnel fixtures may have a mechanism for changing the focal distance between the light bulb and the lens. Many Fresnel fixtures allow the light bulb inside the fixture to be moved relative to the lens focal point to increase or decrease the size of the projected light beam. Such adjustment, typically accomplished via a knob on the back of the fixture, varies from a narrowly focused beam (spot) to a wider beam (flood). Fresnel fixtures have been known to produce a beam as narrow as 7° or as wide as 70°.

Fresnel fixtures are useful in the film, motion picture and television industries not only because of their ability to focus a brighter beam than a typical lens, but also because the projected light is of relatively consistent intensity across the entire width of the beam. Fresnel fixtures are also known to produce a very soft-edged beam which makes them suitable for use as a wash light. In still photography, Fresnel fixtures have been used as a highlight, sidelight/backlight or kicker. A frame in front of the lens is often used to hold a gel to tint the light or wire screens to reduce it or frosted plastic to diffuse it. Barn doors are commonly used primarily to control light spillage or to shape the light.

However, this is not to say that existing (and historical) Fresnel lighting fixtures are efficient in any way. These conventional lighting fixtures have drawbacks or limitations which can limit their flexibility and/or effectiveness. Most of the light that is emitted by an omni-directional light bulb inside known Fresnel fixtures actually strikes and is absorbed and wasted by the cylinder shaped housing of these fixtures. A small portion of the light is bounced off a curved mirror in the back of the fixture and a small portion goes directly out the Fresnel lens. This leaves relatively little of the total light generated to be able to exit the Fresnel lens as harnessed light. Incandescent bulbs are very inefficient to start with and by then introducing them into a Fresnel housing their efficiency drops even further. Moreover, the reflector cannot be larger than the lens aperture, and thus all the radiated light that is neither redirected forward by the spherical reflector behind the bulb nor emitted directly through the lens is absorbed by the casing as waste heat. The major drawback of Fresnel fixtures is the enormous amount of heat energy generated by the bulbs and absorbed by the casing.

The light bulbs used in most common Fresnel fixtures used in film, commercial, and photographic settings are either incandescent, tungsten-halogen, xenon, or HID lamp elements. The enormous amount of heat generated by the bulbs affects the manner and duration in which they are used and particularly in their construction. Such lamps emit infrared radiation which would quickly and catastrophically damage a plastic Fresnel lens. Due to the heat generated, care must be taken with regard to the placement of these fixtures, the manner in which they are handled, and the length of time they can be used (excessive heat affects the bulb life). In addition, such fixtures must be constructed so as to withstand the intense heat of this environment. In the case of HMI light based fixtures the bulb emits large amounts of ultraviolet light that is dangerous and needs glass or filtration that blocks the harmful UV rays. As a result, thick, heavy, lenses that are generally made of Pyrex® type glass are used along with heavy gauge metals for the housing and fixture. This means that current Fresnel fixtures are heavy requiring special attention in transport and the way in which they are installed. Due to their weight, the mounting frames used for traditional Fresnel fixtures are often large and ponderous, making them difficult to move around and otherwise work with. A need, therefore, exists for a Fresnel fixture with an efficient, directed light beam which includes active cooling allowing them to be constructed of light weight materials.

Existing Fresnel fixtures do not lend themselves to work with LED illuminators because there is a power density issue when using LEDs. LEDs by their nature are very efficient in making light but they are rather large individually and it is difficult to get enough of them in close proximity to make a pseudo point light source and to be able to remove the heat from them (cool them) properly while they are in such proximity.

LED based Fresnel fixtures are available and used for club lighting or theaters that are very low power, in the 50 watt range. However, they don't have a very tight point source nor do they deal with the power density as they have sealed housings which can only radiate the heat, which limits their ability to transition to the higher power levels required for image capture. These lighting fixtures typically include a variety of colorized LEDs in hues such as red, green, and blue (i.e., an "RGB" combination), and sometimes include other intermixed bright colors as well. These types of fixtures are not well suited for applications requiring more precision lighting, such as film, television, and so on. Among other things, the combination of red, green, and blue (or other) colors creates an uneven lighting effect that would generally be unsuitable for most film, television, video, motion picture or photographic applications. Moreover, most of these LED-based lighting apparatus suffer from a number of other drawbacks, such as requiring expensive and/or inefficient power supplies, incompatibility with traditional AC dimmers, lack of ripple protection (when connected directly to an AC power supply), and lack of thermal (heat) dissipation.

A need, therefore, exists for an LED based Fresnel fixture of over 100 watts that addresses the thermal and power density issues and is suitable for use as a high powered motion picture light. The light should be light weight so that technicians can easily move it, it will preferably be silent so it does not interfere with sound recording; and, it will preferably be efficient in order to justify the transition from incandescent fixtures. In addition, a need exists for such a light which is also dimmable through a great range, focusable from an even wide beam to a tight even spot, and powerful enough to light traditional film, television, video, or movie scenes with the same number of fixtures as is used with incandescent fixtures. The operation and controls should be similar to existing Fresnel fixtures so as to ease the burden on the lighting technicians who are tasked with learning and applying new technology lighting systems.

In remote video capture applications, such as live sporting events, the historical practice was to send a crew, including a director, and technical people including a lighting director and gaffers to the venue along with the broadcast talent to cover an event. These practices incur substantial expense and the lighting traditionally needs large power cables run from large generators stationed outside the venue. It is becoming more common for a broadcaster to send equipment and broadcast talent to a venue which is set up by local technical personnel and it would be desirable to have the lighting equipment operated remotely by the lighting director and technical crew. In the case of live or stored for later broadcast events such as interviews, it has become common practice for the interviewer and interviewee to be in separate studios to conduct the interview rather than one or the other traveling so that the interview can take place face-to-face. Broadcasters have begun and are likely to expand the practice of sending equipment to a location with no crew which can be set up by a local technician or by the interviewee which can be controlled remotely. A need, therefore also exists for a Fresnel fixture which is capable of such remote operation and to operate on standard power from standard outlets.

SUMMARY OF THE INVENTION

Applicant incorporates herein fully by reference U.S. Pat. No. 7,429,117.

The invention is generally directed in one aspect to a novel and versatile lighting apparatus which includes a Fresnel lens and active cooling. For purposes of the instant invention, the term "active cooling" should be broadly construed to include traditional modes of active cooling (e.g., forced air, circulated water or other fluid, etc.) as well as assisted cooling which would include some mechanism for cooling beyond that offered by the conduction/convention afforded by a traditional heat sink, i.e., something other than stationary air heat convection.

According to one general embodiment as disclosed herein, a lighting fixture includes a housing to contain a plurality of semiconductor light elements, such as LEDs, secured to a panel or board. This LED panel preferably includes a tight array of high power LEDs. For purposes of the instant disclosure, the term "high power LEDs" should be understood to refer to an LED array that is at least 30 watts or, more preferably, 75 watts or greater. More generally, though, a "high power LED array or board" should be understood to refer an array or board of LEDs that would require a heat sink in normal operation.

This LED array or board is preferably mounted to a heat dissipating apparatus to provide active cooling and the LED and heat dissipating apparatus together forming an LED engine. The LED engine is preferably mounted to a slider mated to rails to allow it to be adjusted, via a stepper motor and worm gear and/or crank and worm gear, within the housing with respect to the lens so as to adjust the beam that is projected from the LED panel through the Fresnel lens and emitted from the fixture. Light shaping diffusion (LSD) may be included on or in the housing. A power supply unit may also be included in the housing. When attached together, such as in electrical connection, and enclosed in the housing, the Fresnel lens, LSD, LED engine and power supply unit function as an integrated self-contained lighting apparatus. A touch screen may be positioned in the housing to interface with the technical operator. Optionally, the lighting fixture may have an integrated dimmer switch, and may be capable of receiving PFC power or have an integrated (or removably attached) battery unit.

The LED based Fresnel fixture of the present disclosure employs active cooling to evacuate the highly concentrated heat of a tight array of high power LEDs to outside the Fresnel housing in an efficient and quiet way. The present fixture employs a heat sink preferably supplemented with active cooling in high power applications to evacuate the LED-generated heat outside of the housing. The preferred Fresnel light fixture may use heat pipes as a silent but active cooling solution. The inventive Fresnel fixture may alternatively use a recirculated liquid pipe system (either powered or passive) to move heat away from the heat sink. If the liquid system is powered by a pump, the noise level will be minimal since the only noise source would be a liquid pump. The cooling system might also include one or more Peltier modules that are operating alone or in conjunction with other of the approaches mentioned herein.

The use of fans in motion picture equipment is generally forbidden due to the fact that the noise emitted can be picked up by sound recording instruments. However, the present LED based Fresnel fixture may use a large diameter fan (or fans) or other forced air system running at low speeds or in a laminar flow mode. A fan (or fans) operating in laminar flow mode do not generate turbulence and consequently the only substantial noise source is the bearings and windings in the fan motor which operate at an extremely low and acceptable sound level.

The present fixture, in a preferred embodiment, includes the power supply built into the fixture, preferably not a separate unit connected to the fixture with a power cable. The Fresnel fixture of the present disclosure may be operated by DMX control, by wireless control, or other suitable means, and is powered by any common AC voltage available any place in the world or alternatively by batteries. The present LED based Fresnel fixture may be configured to include a "power factor correction" (PFC) front end on the AC power supply. A suitable power supply unit is disclosed in United States Patent Application No. 2005/0207196 published on Sep. 22, 2005 and incorporated herein fully by reference, however, other suitable power supply units may be known to one of skill in the art and substituted. The power supply of the preferred arrangement would differ from the published disclosure only in that the battery unit would be substituted with AC power supply with a PFC front end. The PFC may be electrically connected to a fixed buck regulator which is, in turn, electrically connected to a dimmable buck regulator. In such an arrangement, the center fixed buck regulator may protect the LED panel or board in the event of failure of the dimmable buck while the dimmable buck may protect the LED panel or board against failure of the middle fixed buck. It is understood that a battery unit (integral to or removable from the fixture) could be included to provide power to the power supply unit.

Different than any existing Fresnel fixture, the fixture of the present disclosure uses a light weight plastic Fresnel lens because heat resistant (such as Pyrex®) glass is not required. White LEDs do not emit infrared light nor do they emit ultraviolet light which most other commercially available light sources do. The glass Fresnel lens is one of the heaviest and most expensive components in existing Fresnel fixtures and they are generally not as efficient as a plastic lens. Glass (Pyrex®) lenses have to have a small radius at the edges of each of the lens elements to keep a stress fracture from forming. Plastics such as Plexiglas and Polycarbonate, in contrast, can have many more elements on the order of a magnitude greater than glass and have no efficiency robbing small radius curves on the edges of the Fresnel elements. In addition, plastic Fresnel lenses can be molded (including injection molded) and do not require expensive and time consuming grinding or casting like glass Fresnels. As a result, plastic Fresnel lenses can be produced in a more cost effective manner to produce a more precise lens.

A common issue with Fresnel fixtures is that they tend to include aberrations (produce colored light) at the edges of the projected beam. The Fresnel fixture of the present disclosure may also employ light shaping diffusion (LSD) to accurately spread the light and to erase chromatic aberrations introduced by the Fresnel lens. In addition to correcting aberration, LSD will also integrate the light of the many LED elements ("hot spots" caused by multiple light sources projected from the light array) so they will project as an even (uniform) beam. LSD material is commercially available and typically printed in predetermined directions, or even patterns, so that the present fixture may be capable of projecting light at preselected beam angles (such as a 16:9 ratio for HD, for example) as may be desired. In a preferred arrangement a 2° to 40° LSD, or any range in between, is acceptable with 5° to 10° LSD being a preferable range, and 5° LSD being particularly suitable. It is contemplated that the LSD in the present disclosure could either be a separate lens or, in the alternative, the LSD could be cast or molded into, or printed onto the back side of the Fresnel lens.

The Fresnel fixture of the present disclosure may have an SD interface so that software updates can be installed with an SD card. Alternatively, such updates may be performed over the Internet through a wired or wireless interface. Wireless remote access can be performed using Wi-Fi, employing 802.11 G or N protocol with a TCP/IP network protocol to interface. In addition, the fixture may be transported from one remote location to the next and may still receive periodic software updates as required using this protocol.

Again using such protocol, the fixture can be updated so as to establish a communication link with the next control base for use at the next venue. It is contemplated to store a URL on the fixture and then connect this URL by way of example, through a commercial service similar to a domain name service acting as a clearing house. The fixture(s) would connect to that server, provide its (their) serial number and then that server would tell the fixture where to connect. So for example, if a sporting event provider/broadcaster owned a fixture or plurality of fixtures of the present disclosure and broadcasting/capturing video from a NASCAR set at a race venue in Florida and wanted the fixture controlled from a remote location, such as Atlanta, the broadcaster will provide a list to the service of the serial numbers of the lights that they shipped to the venue in Florida and when those lights came on, the fixture would know (be instructed by the clearing house) that they need to connect to Atlanta. Although many communications modes might be used to access a light fixture remotely, the preferred embodiment will be to make each light accessible via the Internet using a wireless or wired connection. Once the event is over and these fixtures are packed up for shipment to the next location, such as a golf tournament in Georgia which they want to control from New York, when wired or wireless access is established, the lights could check in with the clearing house which would instruct the fixture to next connect to the base facility in New York.

Remote control of the present fixture can also be performed using a handheld device, such as a cell phone. For example, an application may be installed on a device such as an Apple® iPhone® so as to use the internal accelerometer in the iPhone® in order to control the fixture by rotating the device which signals the fixture to perform a function, such as vary the beam between spot and flood. With a handheld device having an accelerometer, the fixture can be controlled by rotation of the device without the operator taking his or her eyes off the scene being captured. Rotation of the device in turn may dim the light up or down or focus as if the operator were manually raising or lowering a pot on the DMX. On the handheld touch screen a graphic may appear simulating the raising or lowering of a pot while the operator is manipulating the handheld device. A similar graphic may appear on the Fresnel fixture touch screen in order to make adjustments at the fixture. Adjustment may also be accomplished by first selecting a light to be adjusted. The operator could then manipulate the pot graphic on the fixture touch screen, or remotely control by either manipulating the graphic pot on the handheld device or by rotating the handheld. It is also contemplated that an operator could control the fixture by entering a number on a handheld device or the fixture touch screen because the conventional DMX only has 256 possibilities such that the operator will have the option to pick how much intensity or focus by entering a number between 0 and 256. In operation, the fixture uses a telnet port, which is port 23 in a preferred arrangement (standard telnet communications), which is used to simulate a serial port with IP base, or packet based communication. In this way, as opposed to a handheld device such as described above, it is possible to connect to the fixture with any PC or laptop using a terminal emulation program, such as HyperTerminal™ available from HilGraeve, Monroe, Mich. to communicate directly with the fixture. This means that in the event that the operator wants to set up a particular light value or focus value, the operator could do that with a terminal instead of using a handheld device. It is contemplated that the act of connecting with an individual fixture or a multiple of similar fixtures of the present disclosure is extremely fast so that the operator may connect or disconnect from individual fixtures or connect to one fixture at a time or connect selective fixtures or all fixtures at once.

The Fresnel lighting fixture of the present disclosure may also be embodied to include an effects generator suitable for providing continuous illumination for a subject for video capture and still photography. The continuous illumination is also particularly suited as a modeling light for still photography. Furthermore, when a burst of light such as a flash or strobe is required, the Fresnel lighting fixture of this embodiment is capable of generating this required effect in a boost mode. The lighting fixture may also be dimmable in both the continuous or boost mode operation. In addition the light emitted may be shaped or color balanced as desired. Accordingly, continuous illumination such as for modeling and a boost mode for flash or strobe is accomplished in the same light emitter in the same color balance (same quality of light).

In various forms and embodiments, the Fresnel lighting fixture of the present disclosure may be adapted for being mounted to a stand, and may include adapters for such a purpose. The inventive fixture ill have a yoke and the yoke will have a receiver or mount for a lighting stand. The lighting fixture may also be provided with a diffusion lens or color gels, barn doors, and the like known in the art which may be integrated with or detachable from the lighting fixture in a known manner.

The present Fresnel may conveniently be provided in the form of a kit, with one or more Fresnel lighting fixtures, stand, connecting cable(s), adapter(s), lenses or color gels, or may include a self-contained battery unit (integral or removable) and so on, being provided in a single package to allow flexibility and versatility to users in the field. Or alternatively, it may be shipped to a remote event location, such as a sporting event, stadium, or arena, live news event, or the like; set up by a local technician (gaffer) and operated remotely from a base location, thereby eliminating the need for the lighting director (and crew) to travel to the actual event location.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 1 depicts a preferred cooling arm suitable for use with the instant invention.

FIG. 2 contains a schematic illustration of a portion of the embodiment of FIG. 1.

FIG. 3 contains a cross-sectional view of the embodiment of FIG. 2.

FIG. 4 contains a detailed view of a heat sink suitable for use with the instant invention.

FIG. 18 contains a schematic illustration of a preferred general environment of the invention.

DESCRIPTION OF THE PREFERRED EMBODIMENTS

Figure 5:
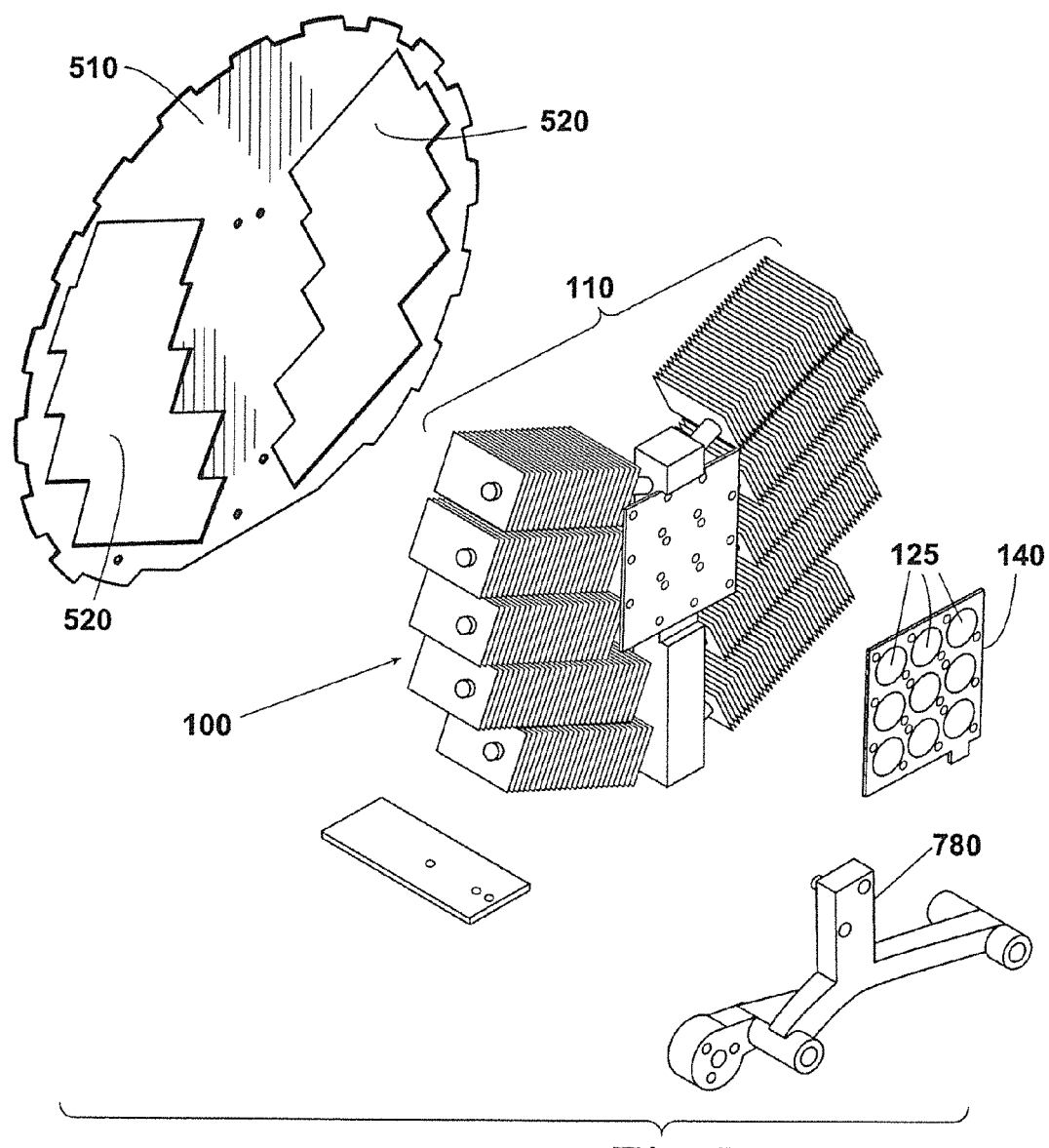
FIG. 5 contains an exploded view of a preferred embodiment of a preferred LCD assembly.

Before describing preferred embodiment(s) of the present invention, an explanation is provided of several terms used herein.

The term "lamp element" is intended to refer to any controllable luminescent device, whether it be a light-emitting diode ("LED"), light-emitting electrochemical cell ("LEC"), a fluorescent lamp, an incandescent lamp, or any other type of artificial light source. The term "semiconductor light element" or "semiconductor light emitter" refers to any lamp element that is manufactured in whole or part using semiconductor techniques, and is intended to encompass at least light-emitting diodes (LEDs) and light-emitting electrochemical cell (LECs).

The term "light-emitting diode" or "LED" refers to a particular class of semiconductor devices that emit visible light when electric current passes through them, and includes both traditional low power versions (operating in, e.g., the 60 mW range) as well as high output versions such as those operating in the range of 1 Watt and up, though still typically lower in wattage than an incandescent bulb used in such application. Many different chemistries and techniques are used in the construction of LEDs. Aluminum indium gallium phosphide and other similar materials have been used, for example, to make warm colors such as red, orange, and amber. A few other examples are: indium gallium nitride (InGaN) for blue, InGaN with a phosphor coating for white, and Indium gallium arsenide with Indium phosphide for certain infrared colors. A relatively recent LED composition uses Indium gallium nitride (InGaN) with a phosphor coating. It should be understood that the foregoing LED material compositions are mentioned not by way of limitation, but merely as examples.

The term "light-emitting electrochemical cell" or "LEC" refers to any of a class of light emitting optoelectronic devices comprising a polymer blend embedded between two electrodes, at least one of the two electrodes being transparent in nature. The polymeric blend may be made from a luminescent polymer, a sale, and an ion-conducting polymer, and various different colors are available. Further background regarding LECs may be found, for example, in the technical references D. H. Hwang et al, "New Luminescent Polymers for LEDs and LECs," Macromolecular Symposia 125, 111 (1998), M. Gritsch et al, "Investigation of Local Ions Distributions in Polymer Based Light Emitting Cells," Proc. Current Developments of Microelectronics, Bad Hofgastein (March 1999), and J. C. deMello et al, "The Electric Field Distribution in Polymer LECs," Phys. Rev. Lett. 85(2), 421 (2000), all of which are hereby incorporated by reference as if set forth fully herein.

The term "color temperature" refers to the temperature at which a blackbody would need to emit radiant energy in order to produce a color that is generated by the radiant energy of a given source, such as a lamp or other light source. A few color temperatures are of particular note because they relate to the film and photographic arts. A color temperature in the range of 3200° Kelvin (or 3200° K) is sometimes referred to as "tungsten" or "tungsten balanced." A color temperature of "tungsten" as used herein means a color temperature suitable for use with tungsten film, and, depending upon the particulars of the light source and the film in question, may generally cover the color temperature range anywhere from about 1000° Kelvin to about 4200° Kelvin. A color temperature in the range of 5500° Kelvin (or 5500° K) is sometimes referred to as "daylight" or "daylight balanced." Because the color of daylight changes with season, as well as changes in altitude and atmosphere, among other things, the color temperature of "daylight" is a relative description and varies depending upon the conditions. A color temperature of "daylight" as used herein means a color temperature suitable for use with daylight film, and, depending upon the particulars of the light source and the film in question, may generally cover the color temperature range anywhere from about 4200° Kelvin to about 9500° Kelvin.

The lighting apparatuses of the present disclosure may utilize any number of lamp elements in a bi-color or other multi-color arrangement. Various embodiments of lighting apparatus as described herein utilize different color lamp elements in order to achieve, for example, increased versatility or other benefits in a single lighting mechanism. Among the various embodiments described herein are lamp apparatuses utilizing both daylight and tungsten lamp elements for providing illumination in a controllable ratio. Such apparatuses may find particular advantage in film-related applications where it can be important to match the color of lighting with a selected film type, such as daylight or tungsten. More importantly, such an arrangement would allow a user to match ambient light color.

In various embodiments as disclosed herein, a lighting apparatus is provided which utilizes two or more complementary colored lamp elements in order to achieve a variety of lighting combinations which, for example, may be particularly useful for providing illumination for film or other image capture applications. A particular example will be described with respect to a lighting apparatus using lamp elements of two different colors, herein referred to as a "bi-color" lighting apparatus. In a preferred embodiment, the bi-color lighting apparatus utilizes light elements of two different colors which are separated by a relatively small difference in their shift or color balance. When reference is made herein to light elements of two different colors, the light elements may, for example, include a first group which provide light output at a first color and a second group which provide light output at a second color, or else the light elements may all output light of a single color but selected ones of the light elements may be provided with colored LED lenses or filtering to generate the second color. In a preferred embodiment, as will be described, the bi-color lighting apparatus uses lamp elements having daylight and tungsten hues (for example, 5200° K and 3200° K color temperatures, respectively). Other bi-color combinations may also be used and, preferably, other combinations of colors which are closely in hue or otherwise complementary in nature.

One possible advantage of a bi-color lighting system as contained in the preferred embodiments below is the ability to more easily blend two similar colors (e.g., 5500 K and 3200 K color temperature hues), particularly when compared to a tri-color (e.g., RGB) lighting system that relies upon opposing or widely disparate colors. The blending process of two similar colors is not nearly as apparent to the eye, and more importantly in certain applications, is a more suitable lighting process for film or video image capture devices. In contrast, attempting to blend three primary or highly saturated (and nearly opposite colors) is much more apparent to the eye. In nature one may visually perceive the blending of bi-colors, for example, from an open sky blue in the shade, to the warmth of the direct light at sunset. Such colors are generally similar, yet not the same. Their proportion in relation to each other is a naturally occurring gradient in most every naturally lit situation. This difference is the basis of most photographic and motion picture lighting hues. These hues give viewers clues as to time of day, location and season. Allowing separate control of the two different color lamp elements (such as LEDs), through two separate circuit/dimmer controls or otherwise, provides the ability to easily adjust (e.g., cross-fade, cross-dim, etc.) between the two colors because they do not have significant color shifts when dimmed and blend in a visually pleasing manner, allowing the type of color gradients that occur in nature. In addition, virtually all still and motion picture film presently used in the industry is either tungsten or daylight balanced, such that various combinations of daylight and tungsten (including all one color) are well matched directly to the most commonly used film stocks. These features make the preferred lighting apparatus described herein particularly well suited for wide area still, video, and motion picture usage, especially as compared to RGB-based or other similar lighting apparatus. The above principles may also be extended to lighting systems using three or more lamp element colors.

Referring now to the drawings, wherein the reference numerals indicate the same parts throughout the several views, according to a first preferred embodiment there is provided a high wattage LED actively cooled variable focus lighting fixture for use in image capture applications. The instant invention preferably utilizes a novel near noiseless active cooling system that permits high wattage LEDs to be used in conjunction with light weight lenses that are made of materials such as plastic. The preferred embodiment of the inventive device employs a self-contained cooling apparatus that manages the heat that is generated by a LED board to the point where this light source can be used with a plastic Fresnel lens. The preferred cooling apparatus will utilize a variable velocity fan (which is preferably operated at the lower end of its velocity range to minimize noise) or other forced air system together with an evaporation/condensation closed cooling system. In the preferred embodiment, the LED engine will be movable with respect to the lens to vary its focus.

In the preferred embodiment, phosphor based LEDs are employed in the LED engine. Phosphor based LEDs are particularly suited because they provide a broad spectrum of light. However, it is understood that the present disclosure is not limited to phosphor based LEDs as others may be suited for particular applications.

FIG. 18 illustrates a general environment in which one preferred embodiment of the instant invention might be used. In some instances, a video camera 1800 might be directed toward a subject 1810 that is being illuminated by inventive lighting fixture 605. The camera 1800 of FIG. 18, while illustrated as a motion picture-type camera, could be any type of image capture or optical viewing device, whether analog or digital in nature. For example, the camera 1800 might use film, video tape, or solid-state image capture circuitry (e.g., CCDs) and may be a still photography camera, a motion picture camera, or some combination of the two.

As is illustrated in FIG. 18, one embodiment of the inventive lighting fixture 605 is preferably attached to a stand 1820. The stand 1820 may be of a conventional nature, with a C-shaped yoke 610 for securing the lighting fixture 605 and allowing it to tilt for directional lighting. The C-shaped yoke 605 may be rotatable or pivotable and, thus, conveniently provides a variety of directional lighting options.

In alternative embodiments, a ball and socket mechanism may be used to rotate or pivot an attached lighting fixture and might use using socket joints similar to those used, for example, with computer monitors. Likewise, in any of the foregoing embodiments, motorization may be employed to control the movement of the lighting yokes or stand. Motorized controls are well known in the art for lighting apparatus (particularly in the performing arts field) and the motorized control may be either automated or manual in nature.

Figure 6:
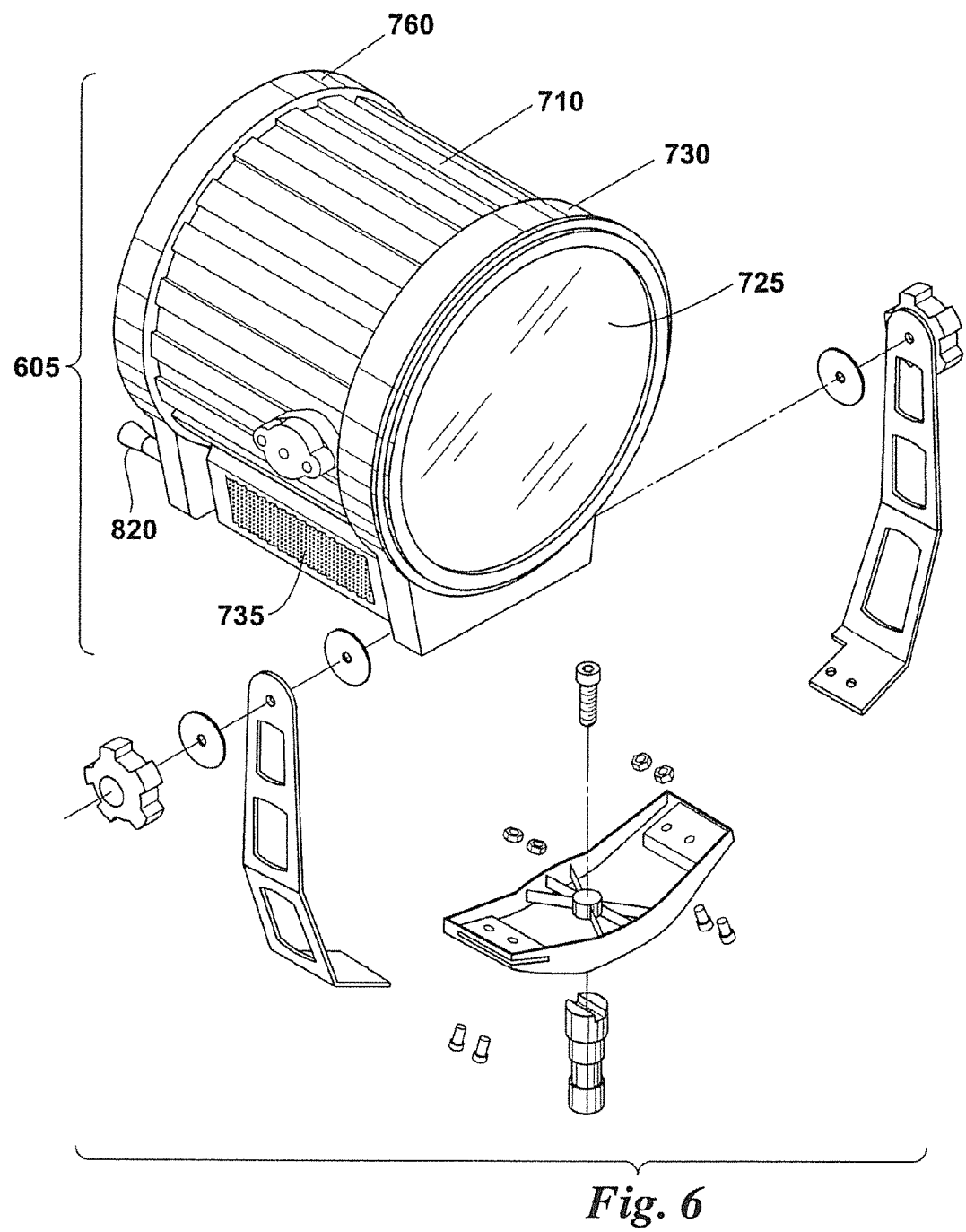
FIG. 6 contains an external view of the instant invention after it has been installed within a light fixture.

FIG. 6 contains an external view of a lighting fixture 605 that would be suitable to house the instant invention. Preferably, the outermost lens will be a plastic Fresnel lens 725 that is oriented such that the grooves of this lens are facing outward as is conventionally done. A plastic Fresnel lens is preferred because of its light weight as compared with a traditional glass optical lens (which may or may not be Fresnel). For example, a plastic Fresnel lens may weigh only 10%-15% as much as a glass Fresnel lens of the same size. Although plastic is the preferred material from which to construct the lens 725, any optically transparent material might be used. Additionally, transparent elements might also be used, where "transparent" should be understood to mean a material that allows light to be transmitted therethrough. This definition of "transparent" also includes lenses, filters, diffusers, etc., that are colored or tinted.

Figure 7:
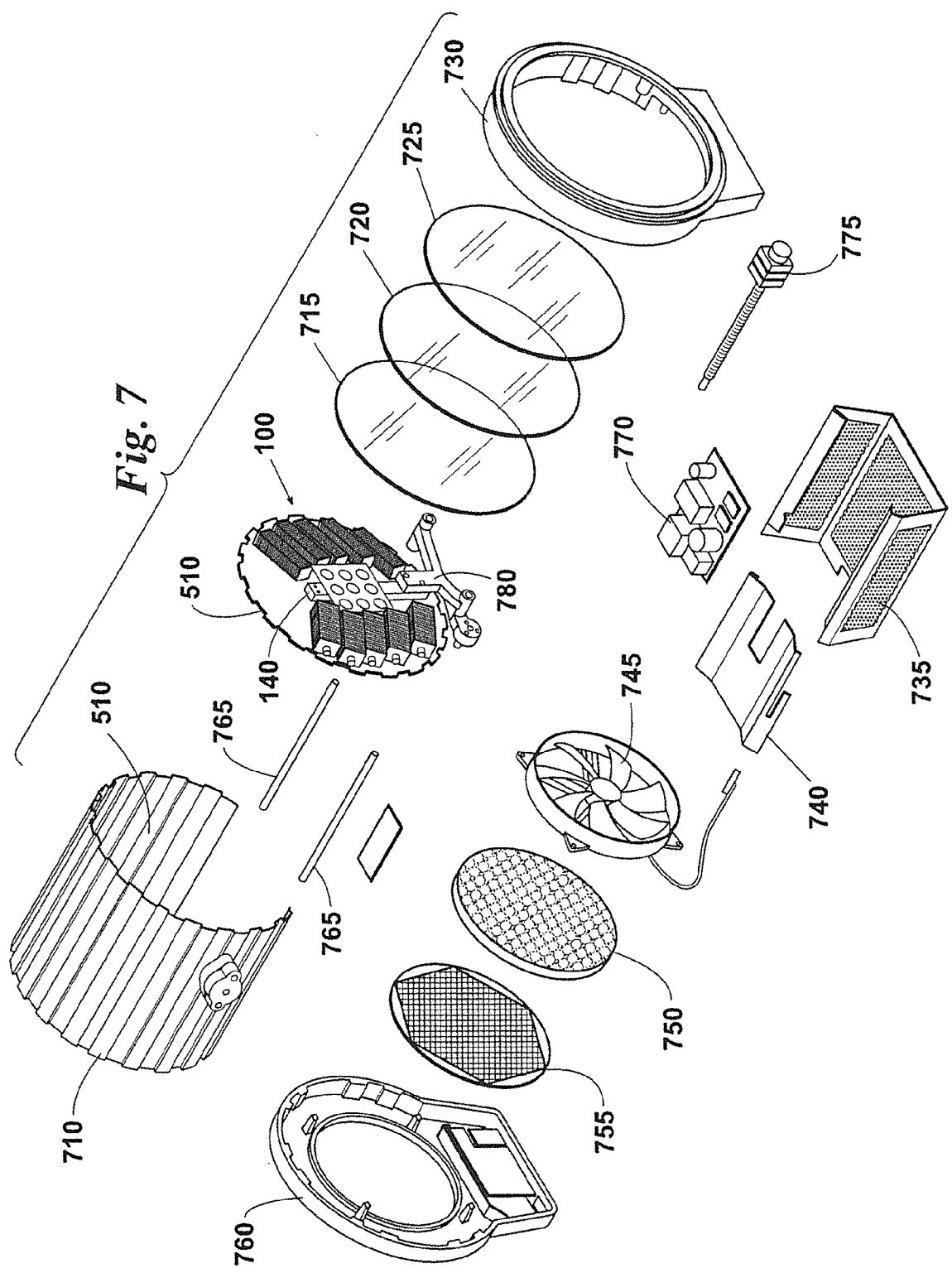
FIG. 7 contains an exploded view of the light fixture of FIG. 6.

FIG. 7 contains an exploded view of the embodiment of FIG. 6. Of particular interest is the LED engine 100. As is indicated in this figure, and as will be discussed in greater detail below, the LED engine 100, as that term is used herein, comprises some sort of cooling element (e.g., cooling element 110) together with an LED array 140. In the preferred arrangement, the LED engine 100 will be surrounded by a generally planar baffle 510 that is sized to largely occupy the interior of the fixture 605. Preferably, the LED engine 100 and its baffle 510 will be mounted on a slider 780 that is designed to be mated with rails 765, the slider 780/rails 765 combination making it possible to adjust the longitudinal position of the assembly 100 within the fixture 605. This, of course, changes the distance between the LEDs 125 and lens 725, thereby making it possible to vary the focus of the beam that is emitted from the fixture 605.

According to a preferred embodiment, an electric stepper motor 775 is provided to allow a user to move the LED engine 100 and baffle 510 forward and backward within the fixture 605. Preferably, the crank 820 will provide an alternative means of moving the LED engine 100 and might be useful in those instances when the stepper motor is not operational or cannot be operated because of noise considerations.

A front cover 730 is provided to help to hold the lenses in place. Additionally, and in the embodiment of FIG. 7, there will preferably be some combination of a Fresnel lens 725, a light-shaping diffuser (LSD) 720, and a polycarbonate protective lens 715. Those of ordinary skill in the art will recognize that there are many lens permutations that might be utilized in the placement of the three lenses 715, 720, and 725. However, the illustrated configuration is the preferred one. Additionally, in some instances, additional lenses might be utilized (e.g., color filters, etc.) either external to the fixture 605 or internal to it, the use of such being well known to those of ordinary skill in the art. Also, multiple lenses could be combined. For example, light-shaping diffuser 720 could be combined with Fresnel lens 725 such as by casting or molding the LSD into, or printing it onto, the back side of Fresnel lens 725.

Figure 14:
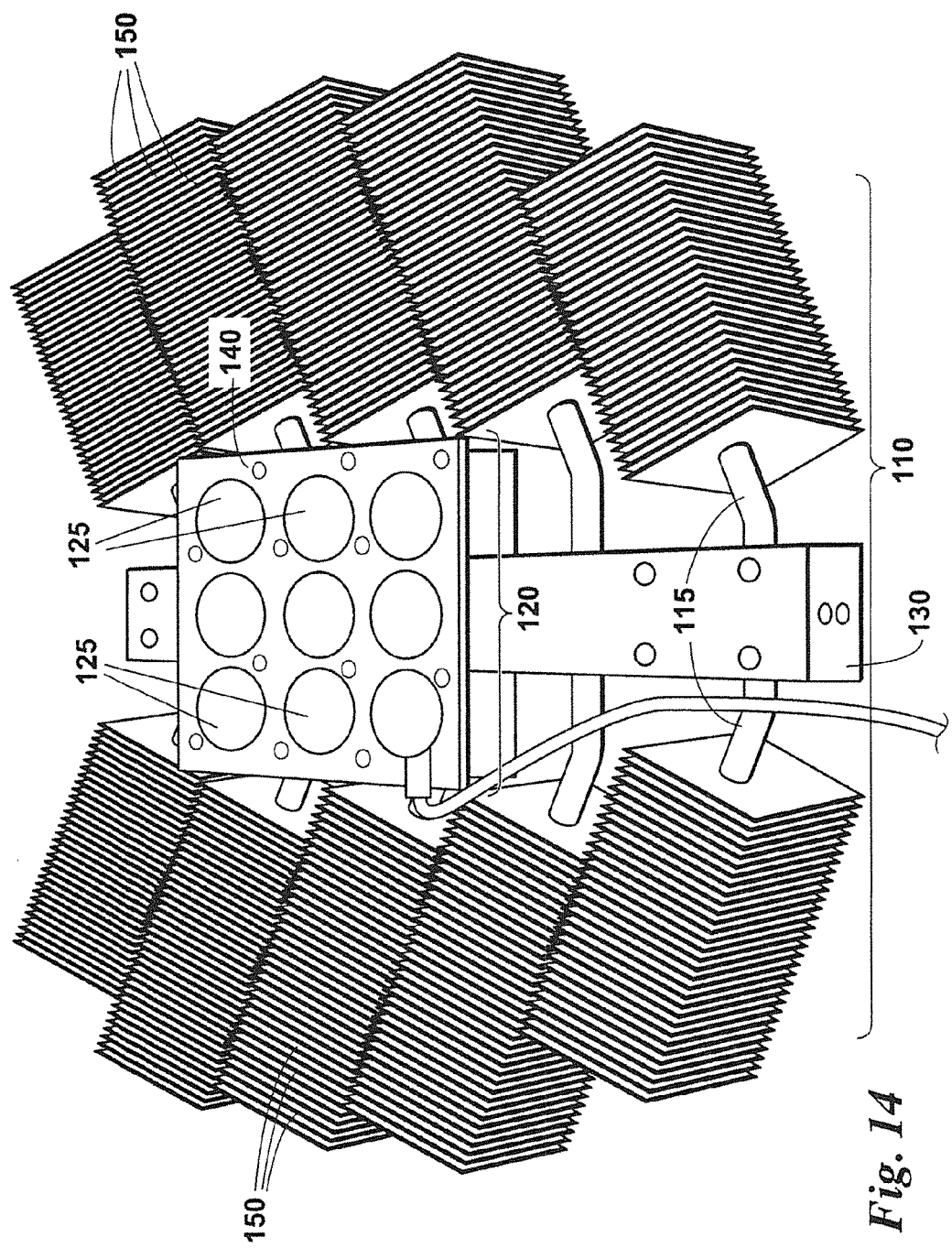
FIG. 14 depicts a preferred embodiment of an LCD assembly suitable for use with the instant invention.

The light from the light fixture 625 is generated by LED engine 100 and, more particularly, by the LED array 140 within the LED engine 100. It should be noted that white LEDs from a manufacturer such as BRIDGELUX® would be acceptable for use with the instant invention. As is made clear in FIGS. 14 and 5, the LED array 140 contains a number of individual LED elements 125 that are preferably regularly spaced to form a tight array. In the preferred arrangement, the total wattage of the LED array 140 will be at least 100 watts. Lights such as this are especially sought after for use in applications such as movies and commercials, wherein very bright, highly directional white lights are needed to illuminate an individual or product for image capture. However, because of the heat that such a concentrated collection of lights generates and in view of the use of one or more plastic lenses, some sort of cooling will need to be provided as is discussed below.

Figure 12:
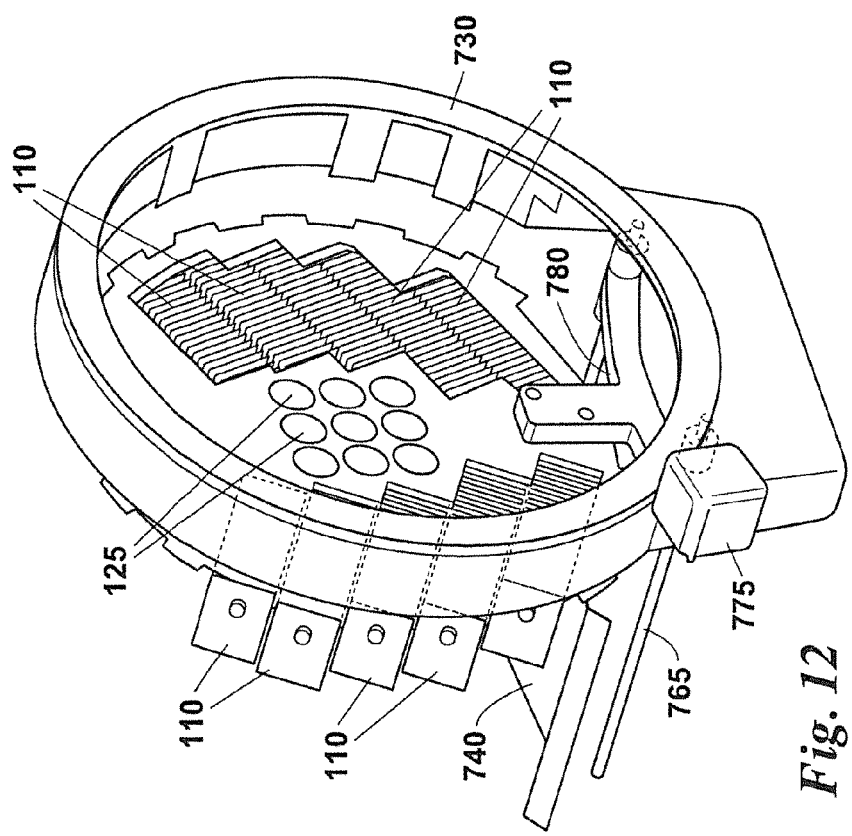
FIG. 12 contains a rendered 3-D view of the embodiment of FIG. 7 with the slider, air dam, and stepper motor in place.

As is suggested by FIGS. 5, 7, and 12, the LED engine 100 will preferably be mounted atop a slider 780 or similar mechanism, one purpose of which is to allow a user to vary the distance between the LED array 140 and the lens 725. Preferably, the slider 780 will be designed to mate with a plurality of rails 765 which are intended to make it possible to move the entire light assembly within the light fixture 605. It is understood, however, that in an alternate embodiment, the LED engine 100 could be fixed and the lens 725 mounted so as to be movable with respect to LED engine 100, or both could be movable with respect to each other.

Preferably, the housing 710 of the lighting fixture 605 will be made of aluminum and be generally cylindrical in shape.

Inside the fixture 605, the baffle 510 that encloses the LED engine 100 will be designed to fit closely to the interior surface of the housing 710. As can be most clearly seen in FIG. 5, the baffle 510 will preferably contain cutouts 520 that are designed to mate with and accommodate the cooling arms 110 of the LED engine 100 (FIGS. 1 and 5). Preferably, when the baffle 510 is installed on the LED engine 100 and the baffle 510/assembly 100 combination is in place within the fixture 605, air that moves longitudinally within the fixture 605 will be forced to travel across the cooling fins 150.

Figure 9:
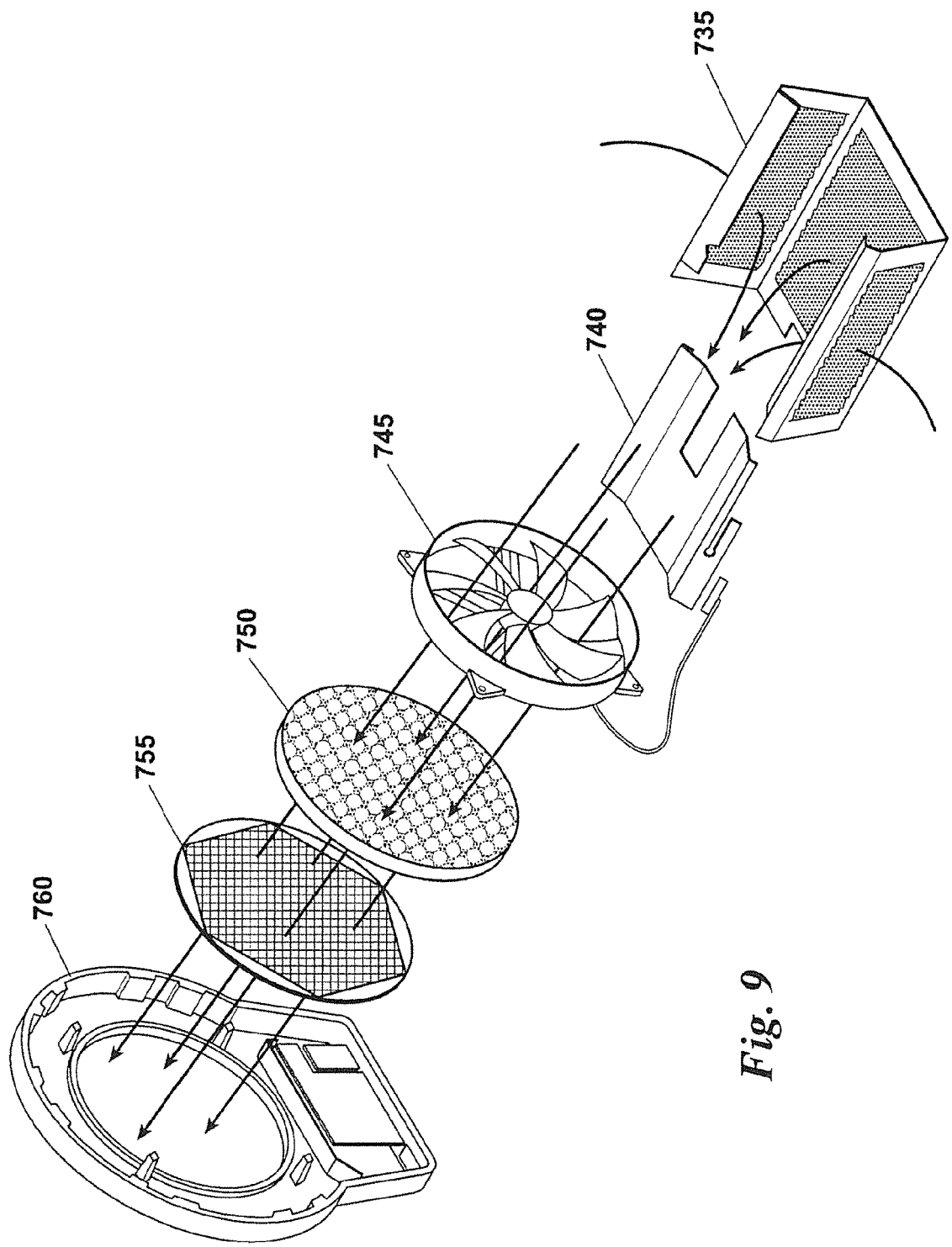
FIG. 9 contains an exploded view of a portion of the embodiment of FIG. 7 which illustrates how air moves through the instant invention when the fan is in operation.

Turning next to FIG. 9, in this preferred arrangement at the rear of the housing 710 will preferably be a rear cover 760 which contains a perforated aluminum back plate 755 mounted in its central opening. The perforated aluminum back plate 755 will preferably be designed to allow air to pass relatively unimpeded through it. Additionally, and proximate to it or in contact with it, is preferably a generally cylindrical honeycomb panel 750 which contains a very large number of longitudinally aligned, relatively small parallel air passageways therethrough. Although these air passageways may be in any particular shape, preferably they will be hexagonal in cross section, thereby forming a honeycomb-type arrangement within the panel 750. One reason such a panel 750 is preferred is that the numerous parallel air passageways will tend to produce laminar airflow in the emerging air currents. The instant inventors have determined that reducing the amount of turbulence in the air that is expelled from the light 605 is an important factor in reducing the amount of noise generated by the instant invention. As has been explained previously, quiet operation of the cooling system utilized by this invention is important because noise that is generated by fans or other cooling mechanisms can often be heard on microphones that are positioned nearby.

Additionally, in the preferred arrangement a fan 745 will be provided to increase the amount of cooling that is available to the LEDs. This fan 745 will preferably be one that runs very quietly at least when it is operated at low speeds. Additionally, this fan 745 will preferably be sized to be similar in diameter to the opening in the rear housing 760. Further, this fan 745 will preferably be oriented so as exhaust air from the rear of the light fixture 605 as is discussed in greater detail below. Further, and preferably, the rotational speed of the fan 745 will preferably be variable and under control of the microprocessor (or other programmable device) that might be located within circuit board 750, which might also contain a transceiver for communicating over WiFi, Bluetooth, or other wireless or wired means. This arrangement allows the fan 745 speed to be ramped up as the temperature inside the light 605 increases, thereby increasing the amount of cooling that is available to the LED engine 100. The LED engine 100 will then be preferably situated between the fan 745 and the polycarbonate lens 715. Finally, the base 735 of the light fixture 605 will preferably be perforated so as to allow air to pass therethrough.

With respect to the operating parameters of the fan 745, in the preferred arrangement, the fan will be thermostatically controlled. Preferably, a thermistor (or a similar element that is responsive to changes in temperature) will be situated proximate to the LED array 140 on the heat sink 130 (which has proven to be a reliable way to measure the temperature of the LEDs 120) and will be used to regulate the speed of the fan 745. In the preferred embodiment, a tachometer feedback is provided to monitor the RPM of the fan. This is preferably accomplished by a fan control system in the microprocessor which calculates the speed of the fan. The speed of the fan is regulated by the microprocessor. Those of ordinary skill in the art will recognize that it is desirable to operate the fan 745 at as low a speed as is feasible so as to minimize the noise that is produced thereby, but yet fast enough to provide a suitable amount of active cooling of the LED array 140. On the other hand, there will be times when the fan 745 must be operated at near maximum RPM to prevent damage to the components of the light fixture 605. Although the exact operating parameters of such a fan will likely need to be determined empirically, the instant inventors have determined that for a 6" light with a light output of 75 W, for example, when the temperature of the heat sink 130 is below, say, 60° C., the fan will be operated at a fairly low speed, e.g., about 900 RPM. On the other hand, when the temperature is at or about 70° C., the fan will be operated at near full speed, e.g., at about 1700 rpm. Between these two limits, the speed of the fan will preferably be varied linearly. Obviously, the foregoing has only been offered as a specific example of the sorts of speeds that might be utilized for the size and power selected and these values should not be construed to be required operating parameters. Other fan speeds could be selected by one of skill in the art which are suitable for use in other light configurations, sizes and applications.

With respect to the acceptable noise level of the fan, in the preferred arrangement, a fan operating at 900 rpm the fan will be substantially inaudible.

When the fan 745 is in operation, air will be drawn in through the perforated base 735 and channeled by the air dam 740 and baffle 510 to pass through the cooling fins 150 of the LED engine 100 and then exhausted from the back of the light fixture 605 through the perforated back plate 755.

As can best be seen in FIGS. 2-4, the heat sink 130 will preferably be sized to be commensurate with the LED array 140. The heat sink 130 will preferably be formed from a solid block of aluminum (or any other metal or other material that would be suitable for use as a heat sink). Other materials may be added, employed or substituted in alternate heat sink composition embodiments. Such materials are known in the art. In a basic embodiment, for example, the heat sink may include extruded aluminum or fins or plates of extruded aluminum or other heat spreading material or thermally conductive material such as thermal pads to provide active cooling.

As is generally indicated in these figures, the heat sink 130 in the preferred embodiment will contain a number of passageways 310 therethrough. Preferably, these passageways 310 will be sized to accommodate the conduits 115 of the cooling arms 110.

In the preferred embodiment, each cooling arm 110 will preferably be a closed system that is separate from the others. Preferably, the cooling arms 110 will be configured to be upwardly sloping away from the center heat sink 130 so that their lowest point will occur within the heat sink 130. The conduit 115 component of each arm 110 will preferably be sealed at both ends for reasons that will be discussed at greater length below. In addition, each conduit 115 will preferably have a number of heat fins 150 attached thereto that are designed to improve the transfer of thermal energy between the air and the conduit 115 according to methods well known to those of ordinary skill in the art.

Inside each conduit 115 will preferably be sealed some amount of a coolant that is preferably liquid at the normal operating temperature of the inventive device. By way of a specific example, water (or water mixed with some amount of an antifreeze such an ethylene glycol if freezing temperatures are expected) would be a suitable coolant. Those of ordinary skill in the art will readily be able to devise a coolant (or coolant mixture) that is suitable for use with the instant invention in a particular operating environment.

The instant invention will thus preferably operate generally as follows. When the LED lights 125 are first activated, the coolant will be at rest throughout the conduit 115. Those of ordinary skill in the art will understand that LED lights generally do not radiate heat as does a conventional (e.g., incandescent) light source. However, heat is generated internally and must be disposed of or possible failure of the LEDs or other electronic components could result. As the LED lights 125 continue to operate, some portion of the heat generated thereby will be absorbed by the heat sink 130. This, in turn, will heat one or more of the cooling conduits 115 at or near the regions where they pass through the heat sink 130.

Inside each heat conduit 115 the coolant will similarly be heated. As the temperature continues to rise, that portion of the coolant that is proximate or within the heat sink will begin to move toward the extremities of the cooling arm 110 via convection as a vapor, i.e., the relatively cooler liquid at the ends of the aims will tend to sink via capillary action back to the middle of the cooling arm 110 while the heated coolant will rise toward the termini. The heated coolant will then lose thermal energy to the walls of the conduit 115 and the cooling fins 150 and then condense. As might be expected, this circulation process will continually repeat itself, thereby creating a closed cooling system within each conduit 115. Thus, it should be clear that it is important but not required for the operation of the instant embodiment that the cooling conduits 115 be generally inclined in an upward direction at their outer extremities with their lowest point being located proximate to or within the heat sink 130 for maximum efficiency.

Additionally, in some preferred embodiments instead of relying on capillary or other thermal expansion, etc., to create circulation in the coolant, it is contemplated that active circulation might be employed. By reconfiguring the heat sink 130 and cooling arms 110, a pump might be employed to circulate the coolant within the LED engine 100 so conduct heat away from the LEDs.

Turning next to FIG. 9, the cooling of the heat sink is further assisted by the movement of air across the fins 150. When the fan is running, air is drawn through the perforated base 735 of the lighting fixture 605 and is diverted by the air dam 740 which serves to direct the air upward and past the LED engine 100. The baffle 510 then restricts the flow of air such that it must pass through the fins 150, thereby increasing the rate of heat transfer from fins 150 to the air passing thereby.

It should be also noted that in some preferred embodiments the liquid-based cooling system might be replaced by or augmented with one of more Peltier modules, a Peltier module being a device that utilizes one or more thermocouples to create a cooling effect according to methods well known to those of ordinary skill in the art. Thermocouples are widely used in science and industry for both temperature measurement and temperature control. Broadly speaking, the thermocouple effect is based on the observation that in certain circumstances a temperature differential can be converted directly into electrical energy, with the amount of electrical energy so generated providing an estimate of the temperature. Conventional thermocouples are often formed by joining together a pair of dissimilar metal wires (e.g., the metals having been chosen so that a voltage is observed depending on the size of the temperature difference between the joined and free ends of the pair. The observed voltage (which might be several $\mu V$ per degree Celsius of observed temperature difference) then provides an estimate of the temperature differential along the length of the pair of wires according to standard equations well known to those of ordinary skill in the art.

Conversely, if a voltage is applied to a thermocouple a temperature differential is created between the junction and the free ends of the two elements that comprise the thermocouple, with the junction being either cooled or heated depending on the direction of the applied DC current. If a number of such thermocouples are interconnected, a heating and cooling module (e.g., a Peltier module) may be constructed according to methods well known in the art. Several thermocouples that have been interconnected in series are often also commonly referred to as a thermopile.

In operation, a Peltier module might be affixed, removably attached, or otherwise placed in thermal communication with heat sink 130 (e.g., by attaching same to the front or back of the heat sink 130 proximate to the LED assembly 120). Then, by passing a current of the appropriate polarity through the Peltier module a cooking effect at the heat sink 130 will be generated, with the heat being transferred away from the heat sink 130 to a location, say, outside of the fixture where it can be dissipated.

It should be noted that the preferred design of the invention described herein is that it makes for a very quiet cooling operation. This provides a means of enhancing the heat transfer between the finned heat exchange members 110 and air as it passes therethrough. FIG. 9 illustrates this concept in greater detail.

Figure 10:
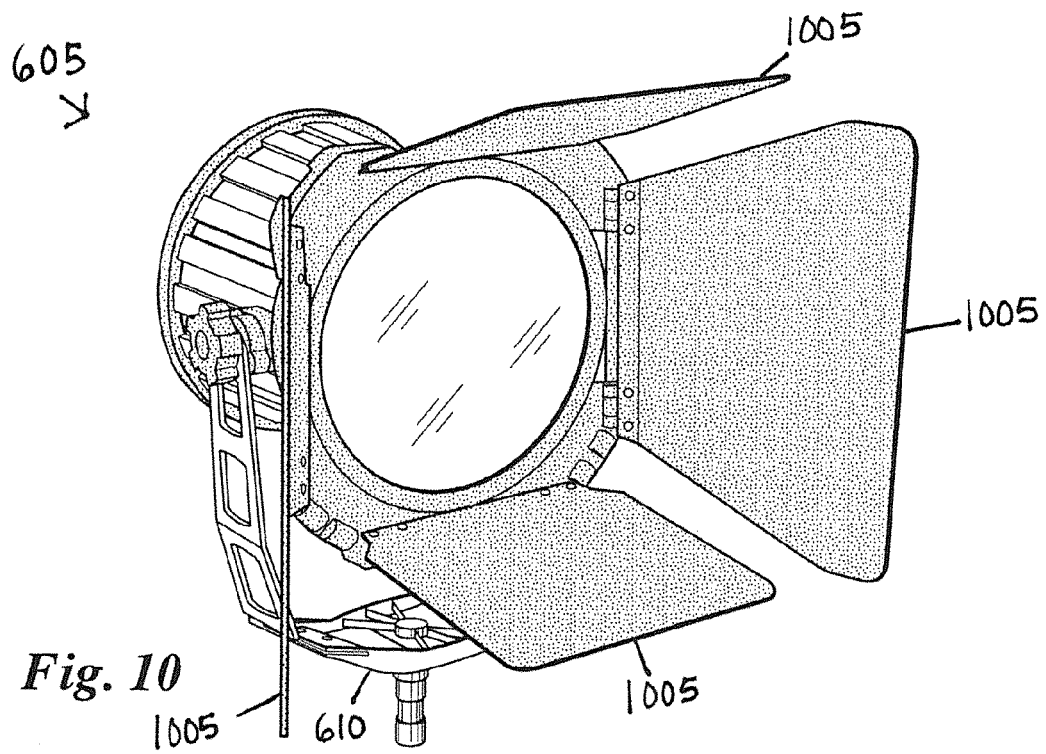
FIG. 10 contains a preferred embodiment of the instant invention which utilizes barn door type shutters on the light.

FIG. 10 depicts preferred embodiment Fresnel light fixture 605 of the present disclosure including an LED engine and Fresnel lens. Fresnel light fixture 605 is depicted mounted on a stand 610 (known in the art) and configured with barn doors 1005 commonly used in the lighting industry for shaping the beam of light directed from Fresnel light fixture 605 attached thereto in a conventional manner. It is contemplated, by way of example only and not by limitation, that the Fresnel fixture of the present disclosure could be designed in multiple sizes, such as the following configurations: 4" lens—35 W; 6"lens—75 W; 12" lens—250-270 W; 18" lens—1,000 W. However, it is understood that many other configurations are also contemplated.

FIG. 12 contains a perspective view of a preferred embodiment of the instant invention. In this figure, it is made clearer that the slider 780 and rail 765 preferably cooperate to create a stable moving platform for the LED engine 100.

Figure 13:
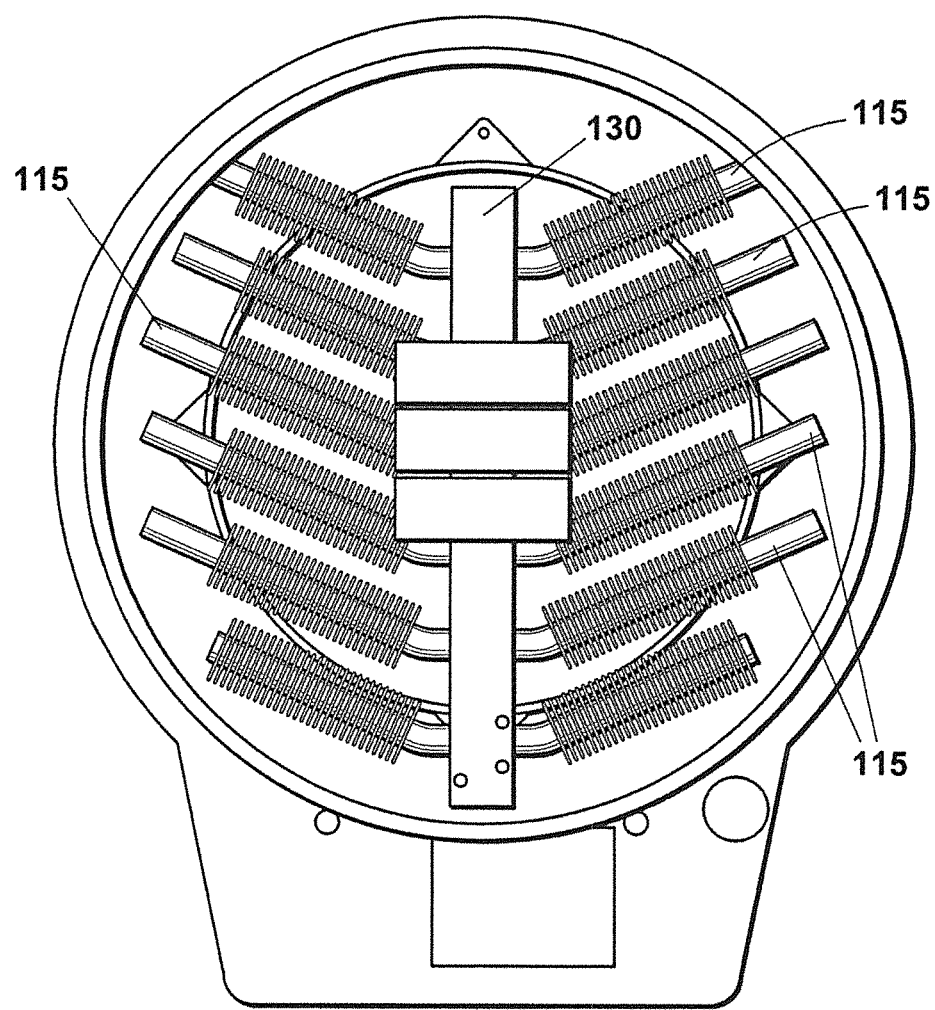
FIG. 13 contains a schematic illustration of a portion of the heat sink 130 without cooling fins or LED lights.

FIG. 13 contains a schematic view of the instant invention which illustrates again a preferred orientation of the instant cooling conduits 115. As was discussed previously, in normal operation, the cooling conduits 115 will be preferably arranged in such a way that their outer termini are elevated with respect to their central portion, thereby making possible the gas-liquid cooling cycle that is preferably used by the instant invention. Further, the central portion of each of the cooling conduits 115 will preferably be at its lowest point when the device is oriented vertically, with the lowest part preferably being somewhere within the heat sink 130.

Figure 8:
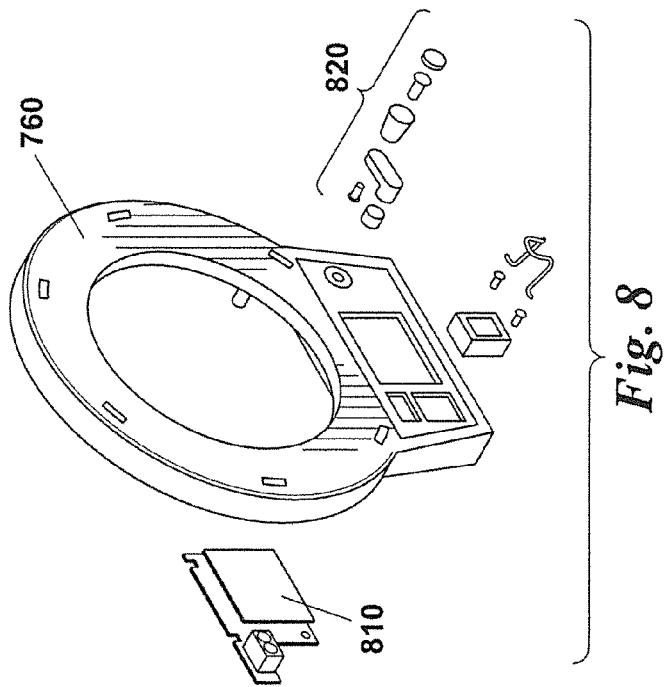
FIG. 8 contains an exploded view of the back panel of the embodiment of FIG. 6.

The instant invention will preferably be provided with a touch screen control panel 810 (FIG. 8) which might include controls for dimming, focus, fan speed, DMX values for DMX controls, etc. It additionally could be used to provide feedback as to the conditions inside of the light (e.g., temperature, status of the LEDs, etc.) as well as system or error messages, etc.

Figure 11:
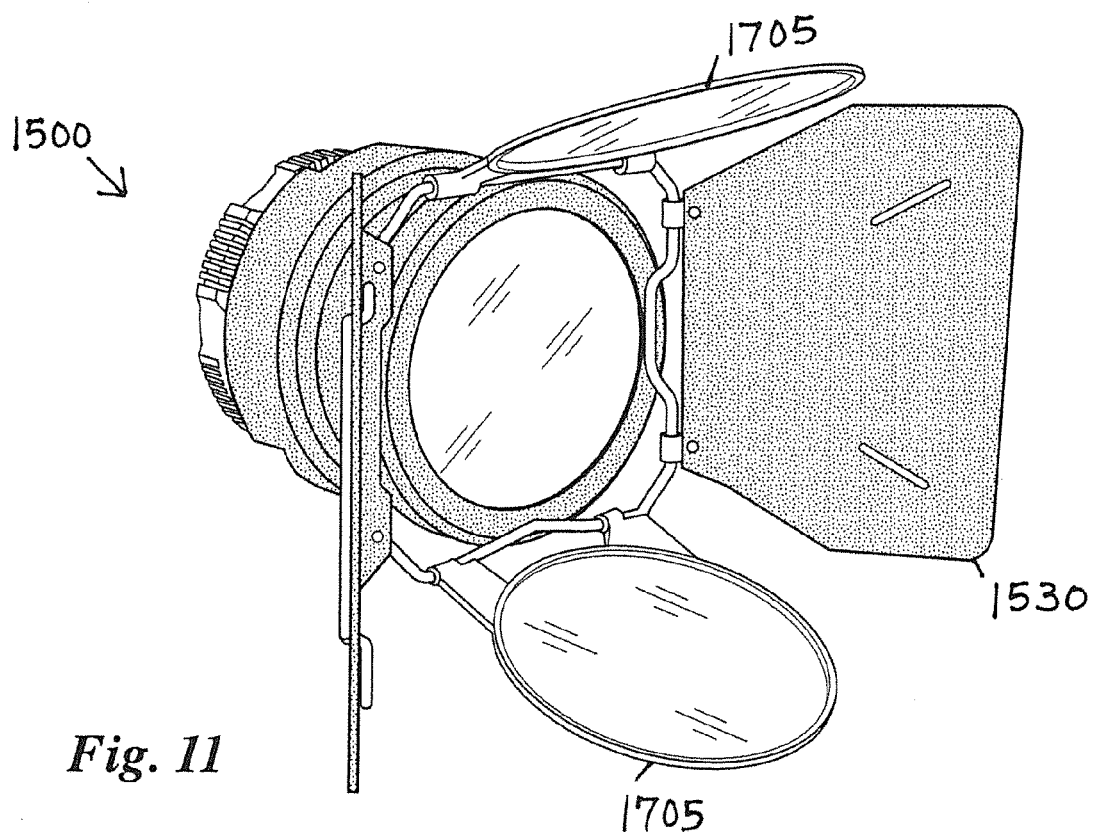
FIG. 11 contains a preferred embodiment of the instant invention which contains upper and lower transparent members that can be moved to cover the opening of the light fixture.
Figure 15:
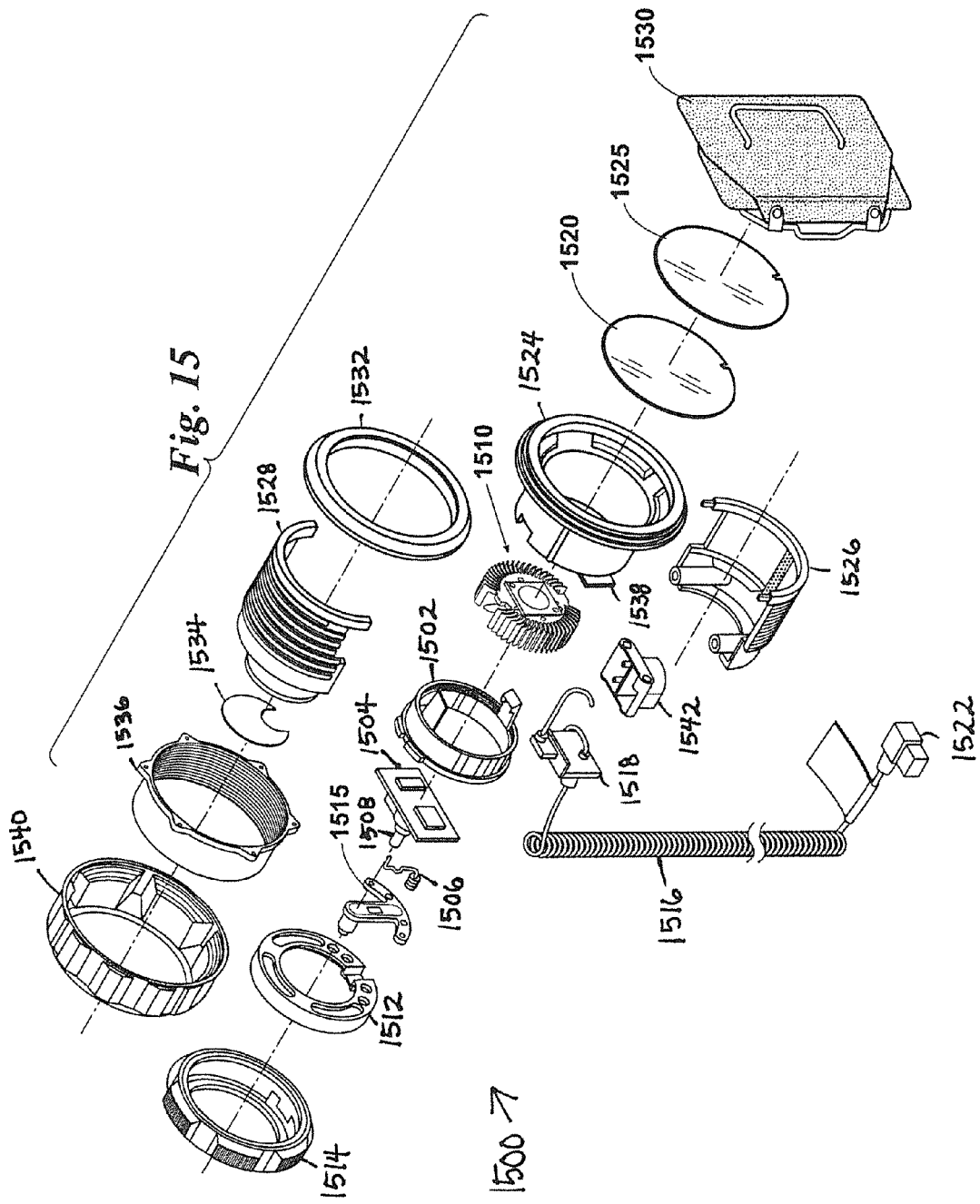
FIG. 15 depicts an exploded view of an alternate embodiment LED Fresnel lighting system including active cooling.
Figure 16A:
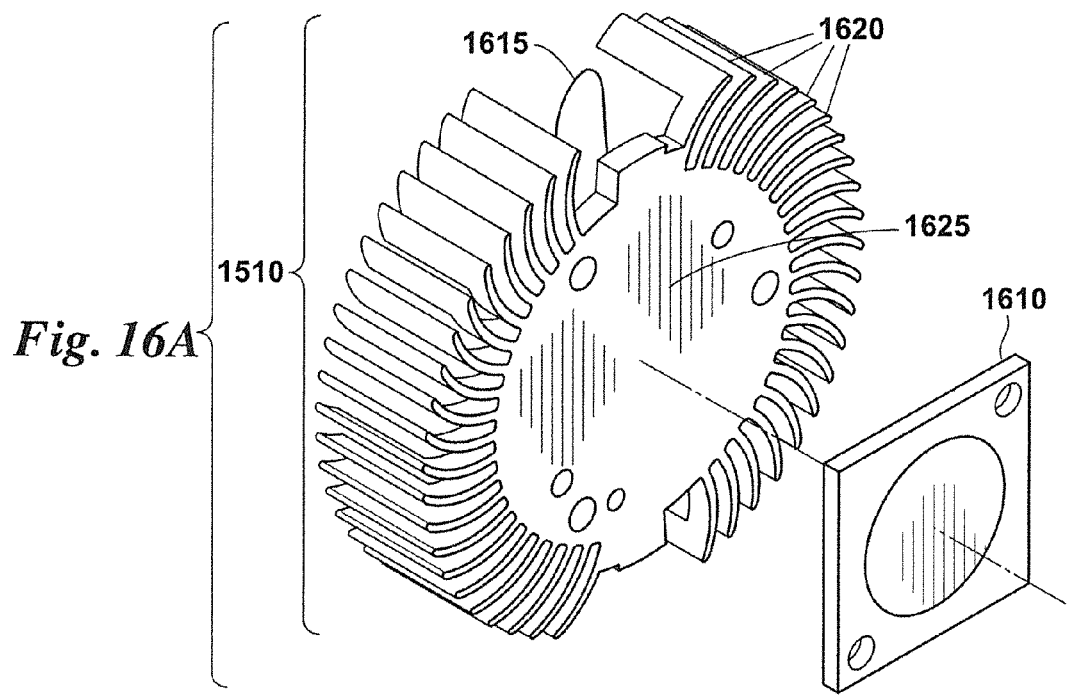
FIG. 16A depicts an exploded view of the LED engine of FIG. 15.
Figure 16B:
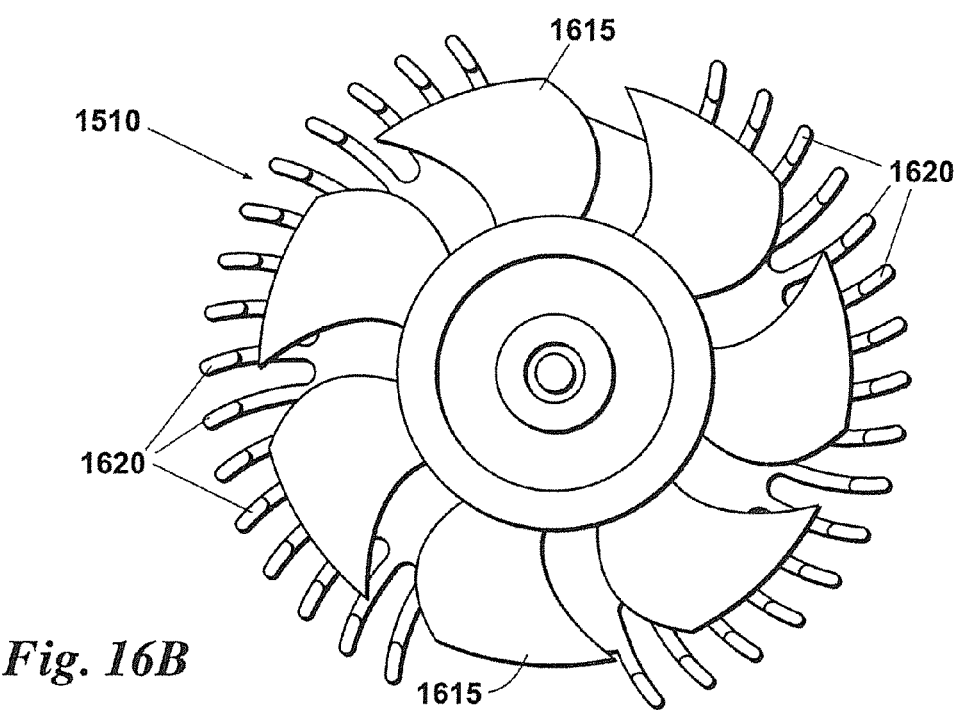
FIG. 16B depicts the LED engine of FIG. 15.
Figure 17:
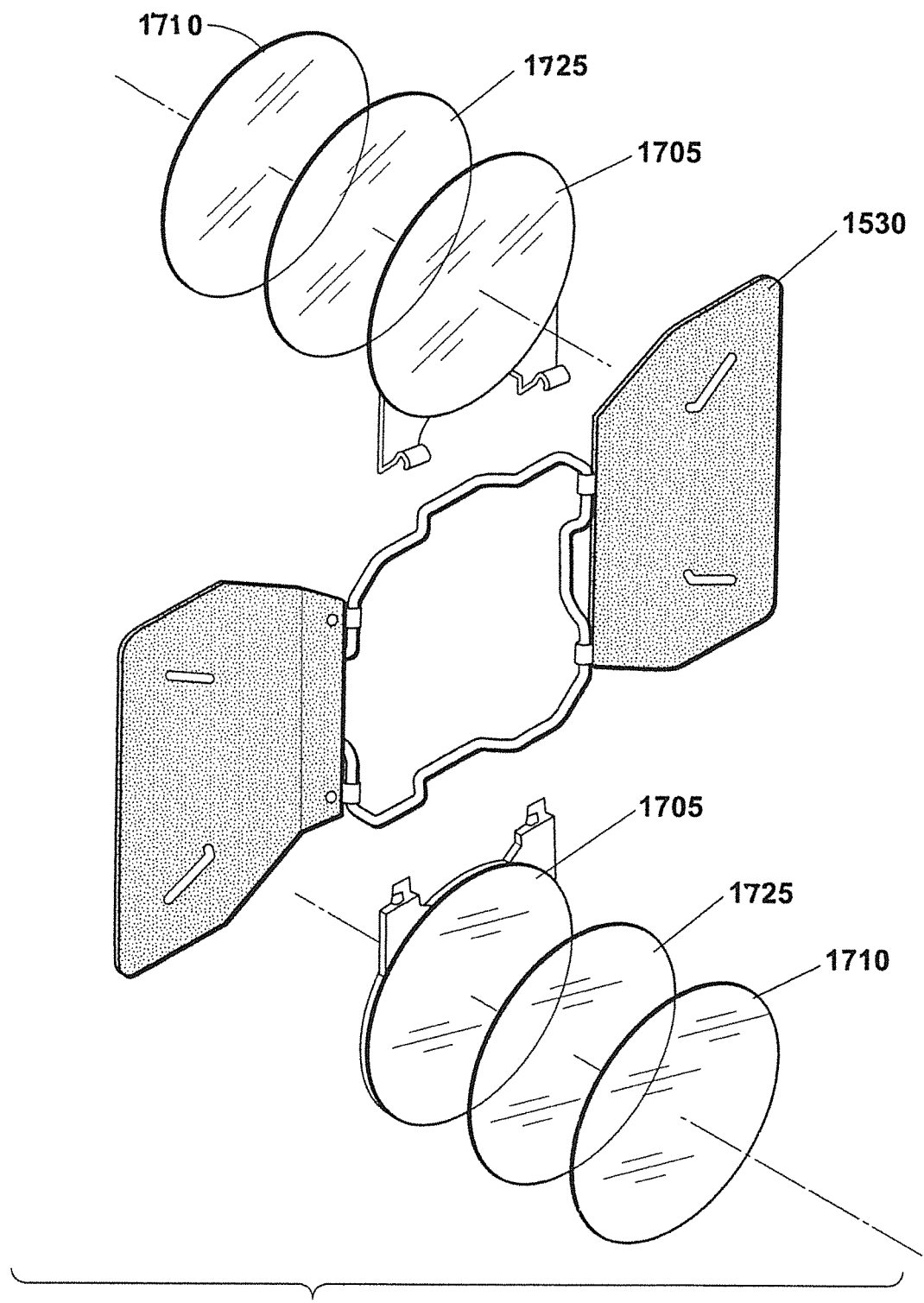
FIG. 17 depicts an exploded view of the barn door assembly of FIG. 15.

With reference to FIG. 11, an alternate embodiment of a focusable light 1500 suitable for on-camera use is depicted. This alternate embodiment is particularly suited for use as an on-camera light for purposes such as Electronic News Gathering (ENG), however, it could also be configured as a stand-alone light mounted to a stand or scaffold for film video or still photography. The alternative embodiment on-camera light includes a Fresnel lens and an LED engine. An exploded view of the light of FIG. 11 is depicted in FIGS. 15-17. This alternate embodiment focusable light including a Fresnel lens and active cooling shall next be described.

Alternate-embodiment focusable on-camera light embodiment 1500 includes the same general construction as LED Fresnel 100 of FIG. 6 as described above, in a compact, typically smaller, form. Particularly, the alternate embodiment also includes LED engine 1510, depicted in greater detail in FIG. 16A and FIG. 16B wherein LED element 1610 is mounted to a heat sink platform 1625 which houses a motor for a fan 1615. In this embodiment, active cooling is provided by heat transfer from LED element 1610 to platform 1625 which is dissipated through a plurality of fins 1620 positioned radially around platform 1625 such that air is permitted to circulate around fins 1620 and dissipate heat thereon. Fan 1615 provides active cooling in substantially the same manner as described above such that air is pulled past fins 1620 and is exhausted out of the housing of the light in substantially the same manner as described above. In this embodiment fins 1620 are solid and do not include internal passageways to implement liquid cooling as in another preferred embodiment described above.

LED engine 1510 in the alternate embodiment may include a single tight array of LED lights 1610. As set forth above, such light assemblies are available from a manufacturer such as BRIDGELUX®.

Referring to FIG. 15, LED engine 1510 is affixed in LED engine carrier 1502 and is in electrical communication with circuit board 1504. Circuit board 1504 controls LED element 1610 as well as fan 1615 (FIG. 16A and FIG. 16B). An LED light 1506 is electrically connected to circuit board 1504 in order to indicate a power on condition of circuit board 1504. Circuit board 1504 includes a potentiometer to control the output of LED element 1610. The potentiometer includes a shaft 1508 extending therefrom and is received by a dimmer arm 1515. Dimmer arm 1515 is secured to an inner ring 1512 which is in turn retained within a dimmer ring 1514 such that rotation of dimmer ring 1514 rotates inner ring 1512 and dimmer arm 1515 which in turn rotates potentiometer shaft 1518 so as to control the output of LED element 1610. Dimmer ring 1514 is preferably constructed of a flexible rubber material to provide a gripping surface for the user.

A power cord 1516 provides the electrical power for circuit board 1504 and includes an adapter 1518 which is received by circuit board 1504. Power cord 1516 also includes an electrical connector 1522 at its other end to receive electrical power. In the preferred embodiment connector 1522 is a standard D-Tap electrical connector known in the art.

A lens carrier 1524 receives LED engine carrier 1502 such that lens carrier 1524 is capable of rotation and axial movement in relation to LED engine carrier 1502. Alternate embodiment focusable on-camera light 1500 includes a Fresnel lens 1525 and may also include a diffusion filter 1520 to provide LSD as described above. The construction of the focusable on-camera light including an LED engine described herein allows for a compact fixture with a lightweight plastic Fresnel lens 1525.

A two-piece outer clamshell housing 1526, 1528 surrounds and encloses light 1500. A lens bezel 1532 secures Fresnel lens 1525 and LSD lens 1520 within lens carrier 1524. Lens bezel 1532 preferably snaps to the front of connected outer housing 1526, 1528. In the preferred embodiment a decal or sticker 1534 is affixed to the rear of outer housing 1526, 1528.

A focusing element 1536 is mounted onto a portion extending from outer housing 1526, 1528 and is configured to receive tabs 1538 extending from lens carrier 1524. Focusing element 1536 is received by an outer or focusing ring 1540 and secured therein (via screws in the preferred embodiment). Outer ring 1540 is preferably constructed of a rubber material and includes projections so as to facilitate grip and rotation by the user. Rotation of outer or focus ring 1540 rotates focusing element 1536 which in turn rotates lens carrier 1524. Such rotation of lens carrier 1524 causes lens carrier 1524 to move axially in relation to LED element 1510. Since lens carrier 1524 carries Fresnel lens 1525 and LSD lens 1520, axial movement of lens carrier 1524 in relation to LED engine 1510 provides focus adjustment to light 1500. As such, in the alternate embodiment, Fresnel lens 1525 is moved in relation to LED engine 1510 in order to provide focus adjustment.

An adapter 1542 may be affixed in outer housing 1526. Adapter 1542 may be configured in any suitable manner to attach light 1500 such as to a camera or stand. In the preferred embodiment, adapter 1542 is a ¼ in-20 adapter for affixing light 1500 to a camera. Such adapters are known in the art.

Accessories such as a barn door assembly 1530 could be applied. Barn door assembly 1530 is shown in greater detail in FIG. 17 such as to include a clear barn door 1705, a diffusion filter 1710, and a pressure adhesive layer 1725. Such assemblies are known in the art.

Accordingly, an alternate focusable, on-camera light assembly including a LED engine and Fresnel lens is thus described. An LED Fresnel lighting system including active cooling may thus be included in a lightweight compact embodiment.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed:

1. A lighting system suitable for image capture, comprising:
  a housing;
  an LED engine supported in said housing capable of emitting light from said housing;
  said LED engine including a fan for forcing air past said LED engine;
  a Fresnel lens supported by said housing wherein at least a portion of said light emitted from said housing passes through said lens to create a beam and wherein said LED engine is movable toward or away from said Fresnel lens to vary the focus of the beam;

a control input for selectively controlling an illumination level of said emitted light;

an adapter for readily mounting said housing to, and disengaging said housing from, a camera.

2. The lighting system of claim 1 wherein said LED engine includes at least one high power LED.

3. The lighting system of claim 1 wherein said LED engine includes an array of high power LEDs.

4. The lighting system of claim 1 wherein said at least one fan produces a laminar flow of air past said LED engine.

5. The lighting system of claim 1 wherein the speed of said at least one fan is monitored.

6. The lighting system of claim 1 wherein the speed of said at least one fan is regulated.

7. The lighting system of claim 1 wherein the temperature of said LED engine is monitored.

8. The lighting system of claim 1 wherein the speed of said at least one fan is regulated based upon the temperature of said LED engine.

9. The lighting system of claim 1 wherein said LED engine includes a heat sink such that said fan passes air across said heat sink.

10. The lighting system of claim 1 wherein said LED engine includes a Peltier module for active cooling.

11. The lighting system of claim 1 wherein said LED engine includes at least one heat pipe for active cooling.

12. The lighting system of claim 11 wherein said at least one heat pipe contains a liquid therein.

13. The lighting system of claim 12 wherein said LED engine includes at least one pump for pumping said liquid through said at least one heat pipe.

14. The lighting system of claim 11 wherein said at least one heat pipe includes at least one upward extending arm.

15. The lighting system of claim 14 wherein said at least one upward extending arm includes a plurality of fins thereon.

16. The lighting system of claim 1 wherein said LED engine includes a first array of LEDs emitting light at a first color temperature and a second array of LEDs emitting light at a second color temperature.

17. The lighting system of claim 1 wherein said LED engine includes at least one phosphor based LED.

18. The lighting system of claim 1 wherein said LED engine is capable of remote control operation.

19. The lighting system of claim 18 wherein said remote control operation is performed via the Internet.

20. The lighting system of claim 18 wherein said remote control operation is performed via WiFi.

21. The lighting system of claim 18 wherein said remote control operation is performed via TCP/IP.

22. The lighting system of claim 18 wherein said remote control operation is performed via a DMX.

23. The lighting system of claim 1 wherein said Fresnel lens is plastic.

24. The lighting system of claim 1 further including a lens for providing light shaping diffusion to said light emitted from said LED engine.

* * * * *